United States Patent [19]
Imada

[11] Patent Number: 5,761,546
[45] Date of Patent: Jun. 2, 1998

[54] IMAGE BLUR PREVENTION APPARATUS

[75] Inventor: Shinji Imada, Kawasaki, Japan

[73] Assignee: Canon Kabushiki Kaisha, Tokyo, Japan

[21] Appl. No.: 689,043

[22] Filed: Jul. 30, 1996

[30] Foreign Application Priority Data

Jul. 31, 1995 [JP] Japan .................. 7-214193

[51] Int. Cl.$^6$ .................................. G03B 17/00
[52] U.S. Cl. .................................... 396/55
[58] Field of Search .................. 396/55, 52, 53, 396/54; 348/208

[56] References Cited

U.S. PATENT DOCUMENTS

| | | | |
|---|---|---|---|
| 4,864,339 | 9/1989 | Gross et al. | 354/202 |
| 5,041,852 | 8/1991 | Misawa et al. | 354/76 |
| 5,266,988 | 11/1993 | Washisu | 354/70 |
| 5,305,040 | 4/1994 | Enomoto | 354/202 |
| 5,444,512 | 8/1995 | Morizumi | 354/430 |
| 5,463,443 | 10/1995 | Tanaka et al. | 354/430 |
| 5,477,297 | 12/1995 | Suzuki | 354/195.1 |
| 5,543,879 | 8/1996 | Takagi | 354/202 |

FOREIGN PATENT DOCUMENTS

2-058034   2/1990   Japan .

*Primary Examiner*—Safet Metjahic
*Assistant Examiner*—Christopher E. Mahoney
*Attorney, Agent, or Firm*—Fitzpatrick, Cella, Harper & Scinto

[57] ABSTRACT

An image blur prevention apparatus having a movable member (correction lens) which moves for preventing an image blur, or an apparatus applied to the image blur prevention apparatus includes the movable member, and an operation device which fluctuates at least one of the movable member and a contact member (a support member for movably supporting the correction lens) contacting the movable member against the other member within a fluctuation range in which the fluctuation does not appear as an image blur (with a fluctuation having an amplitude and frequency, in which the fluctuation does not appear as the image blur). With this arrangement, the frictional force between the movable member and the contact member is reduced (such that a dynamic frictional state is generated by a fluidizing effect), so that a proper operation of the movable member and a proper image blur prevention operation are enabled (smooth movement of the movable member is prevented from being impeded to generate a delay in response).

25 Claims, 19 Drawing Sheets

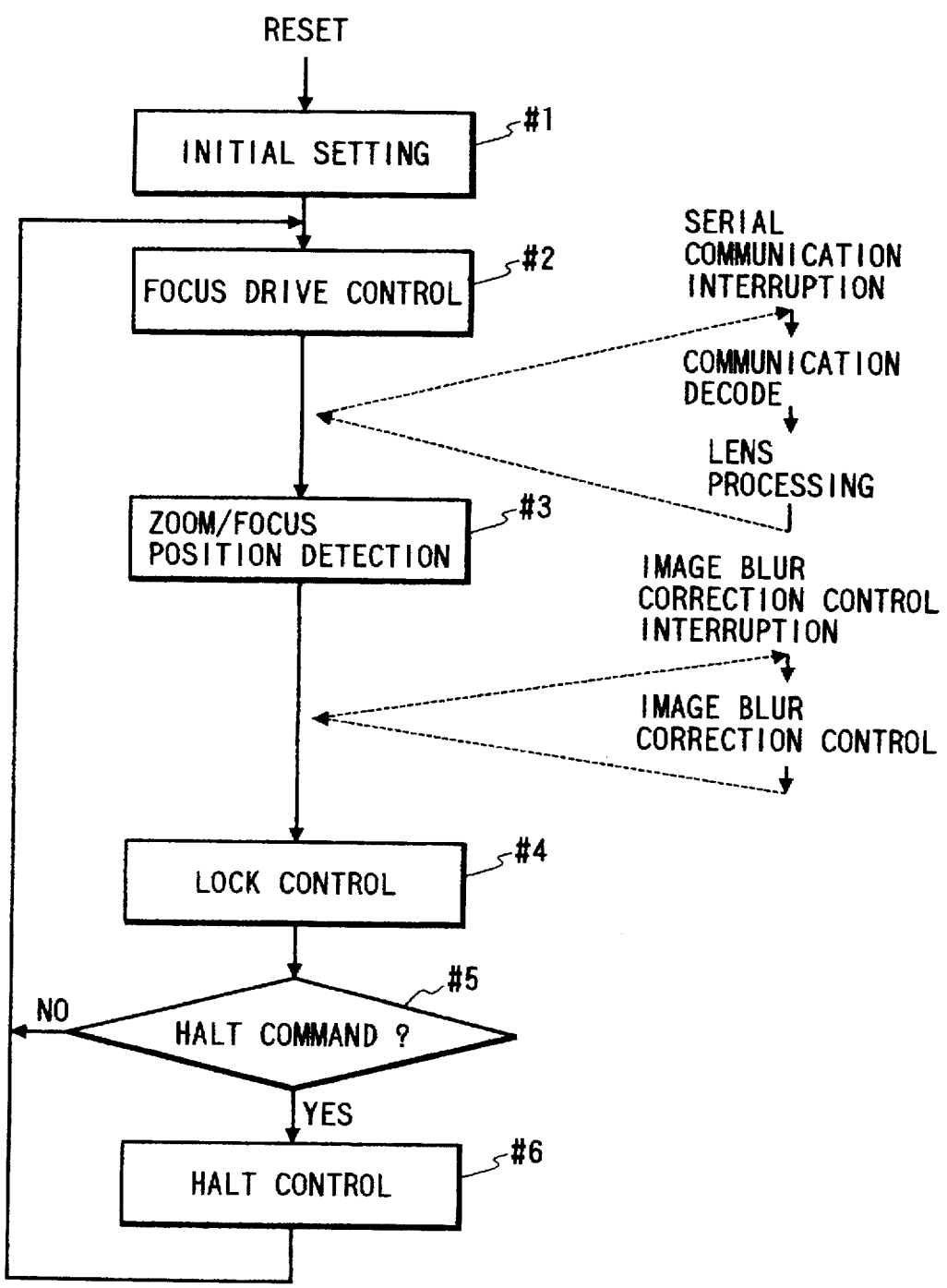

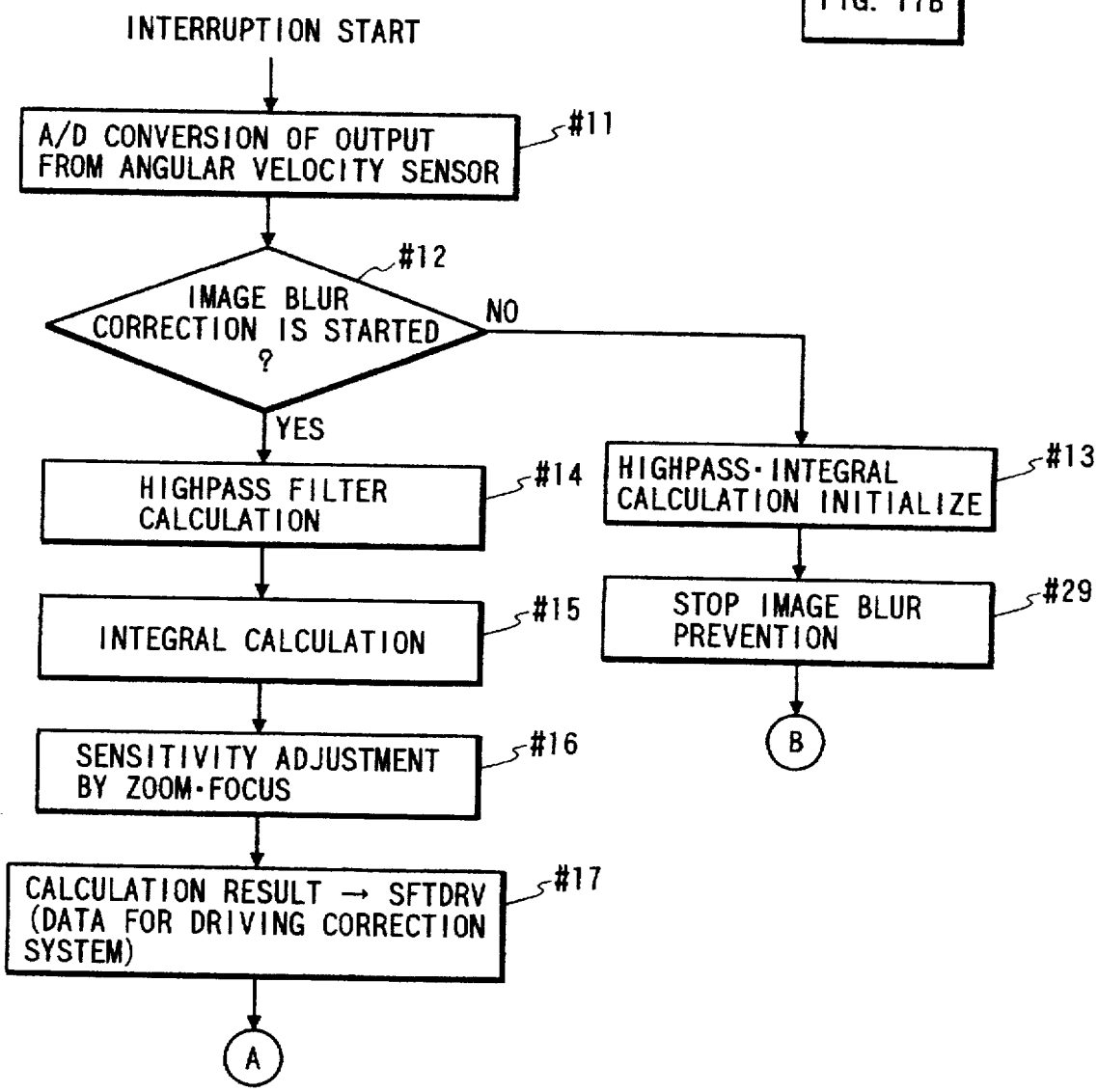

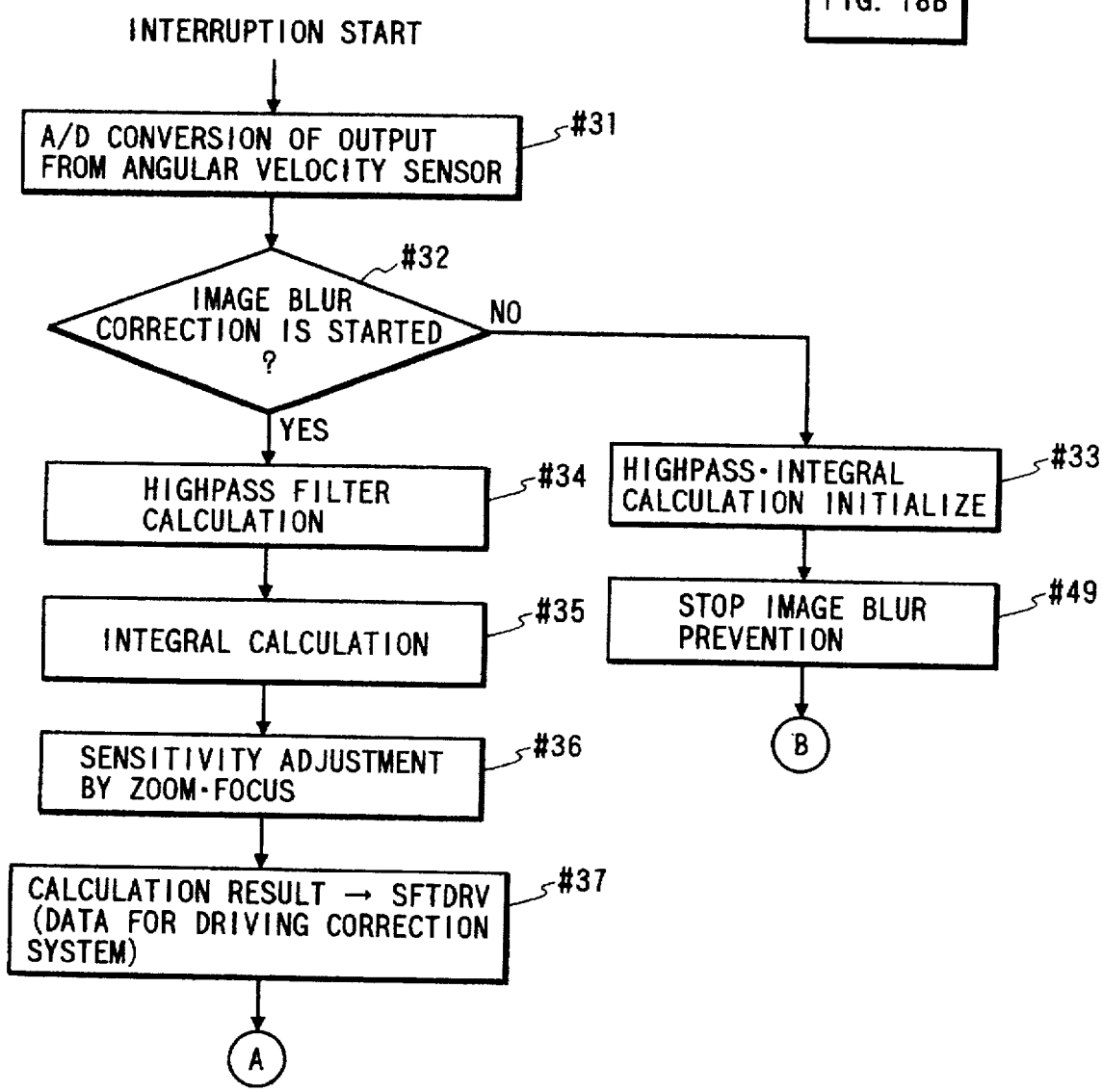

| FIG. 19A |
|---|
| FIG. 19B |

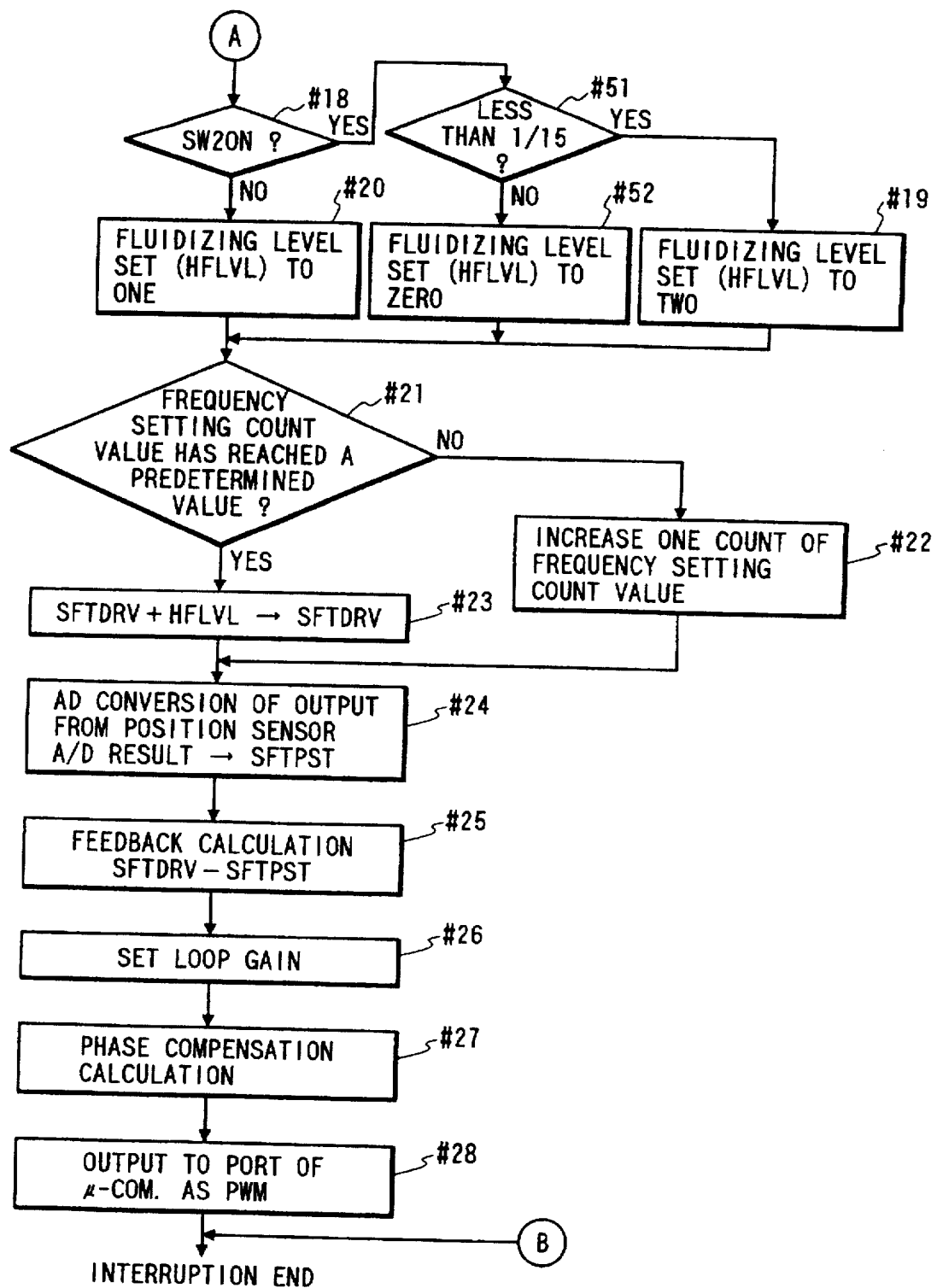

IMAGE BLUR PREVENTION APPARATUS

BACKGROUND OF THE INVENTION

1. Field of the Invention

The present invention relates to an image blur prevention apparatus for preventing an image blur generated in a camera, an optical device, or the like.

2. Related Background Art

In today's cameras, all important operations for shooting or photographing, including exposure determination and focusing, are automated, so there is little probability of a failure in shooting for even a user inexperienced in camera operations.

Additionally, systems for preventing a hand fluctuation acting on a camera (image blur prevention systems) have been recently studied. For this reason, almost all factors that lead to a shooting failure of a photographer have been eliminated. A system for preventing a hand fluctuation will be briefly described below.

The hand fluctuation of a camera in shooting is normally a fluctuation having a frequency of 1 to 12 Hz. As a basic concept for enabling a photographer to take a shot without any image blur even when such a hand fluctuation is generated in releasing the shutter, the fluctuation of the camera caused by the hand fluctuation is detected, and the correction lens is displaced in accordance with the detection value.

Therefore, to take a shot free from an image blur even when the camera fluctuates, first, the fluctuation of the camera must be accurately detected, and second, a change in optical axis caused by the hand fluctuation must be corrected. Detection of the fluctuation (camera fluctuation) is realized in principle by mounting, in a camera, a fluctuation detection means for detecting an angular acceleration, an angular velocity, an angular displacement, and the like and a camera fluctuation processing means for electrically or mechanically integrating the output signal from the fluctuation detection means and outputting an angular displacement. On the basis of this detection information, an optical holding means (correction means) for holding optical elements including a lens and a prism is offset in a direction perpendicular to the optical axis, thereby preventing an image blur.

FIG. 15 is a perspective view schematically showing the main part of a conventional image blur prevention system using a fluctuation detection means, which is used in a camera or the like. FIG. 15 shows a system for suppressing an image blur in directions indicated by arrows 81 (a vertical camera fluctuation 81p and a lateral camera fluctuation 81y).

The system shown in FIG. 15 includes a lens barrel 82, and fluctuation detection means 83p and 83y for detecting a vertical camera fluctuation (fluctuation direction 84p) and a lateral camera fluctuation (fluctuation direction 84y), respectively. A correction means 85 for correcting an image blur generated by a fluctuation holds optical elements (e.g., a lens and a prism) for correction. Coils 86p and 86y apply a thrust to the correction means 85. Position detection elements 87p and 87y detect the position of the correction means 85. The correction means 85 is driven using a position control loop on the basis of the output signals from the fluctuation detection means 83p and 83y as target values, thereby correcting an image blur caused by a fluctuation.

Generally, a shooting operation is performed in various postures, e.g., while tilting the camera up or down. In such a shooting operation, to attach a taking lens having an image blur correction means to the camera body for shooting, the spring constant of a charge spring which is used to so attach an optical holding means for holding an optical element (correction lens) for image blur prevention to a support means fixed in the lens barrel as to be driven must be set to be relatively large since the optical element may tilt along the optical axis due to its own weight to make the optical performance unstable.

However, when the spring constant of the charge spring is increased, the frictional force on the contact surface between a support ball used together with the charge spring and support means having a surface which the support ball contacts becomes large. This impedes a smooth movement of the optical element, resulting in an increase in the remaining amount of the image blur.

SUMMARY OF THE INVENTION

One aspect of the invention provides an image blur prevention apparatus having a movable member which moves for preventing an image blur, or an apparatus applied to the image blur prevention apparatus, comprising the movable member, and an operation device which fluctuates at least one of the movable member and a contact member contacting the movable member against the other member within a fluctuation range in which the fluctuation does not appear as the image blur. With this arrangement, the frictional force between the movable member and the contact member is reduced, so that a proper operation of the movable member and a proper image blur prevention operation are enabled.

Another aspect of the invention provides an image blur prevention apparatus having a movable member which moves for preventing an image blur or an apparatus applied to the image blur prevention apparatus, comprising an operation device for fluctuating the movable member as an operation different from an image blur prevention operation when the movable member is operating to prevent the image blur. With this arrangement, the frictional force between the movable member and the contact portion of another member is reduced, so that a proper operation of the movable member and a proper image blur prevention operation are enabled.

BRIEF DESCRIPTION OF THE DRAWINGS

FIG. 16 is a flow chart showing an operation according to the first embodiment of the present invention;

DETAILED DESCRIPTION OF THE PREFERRED EMBODIMENTS

Figure 1:
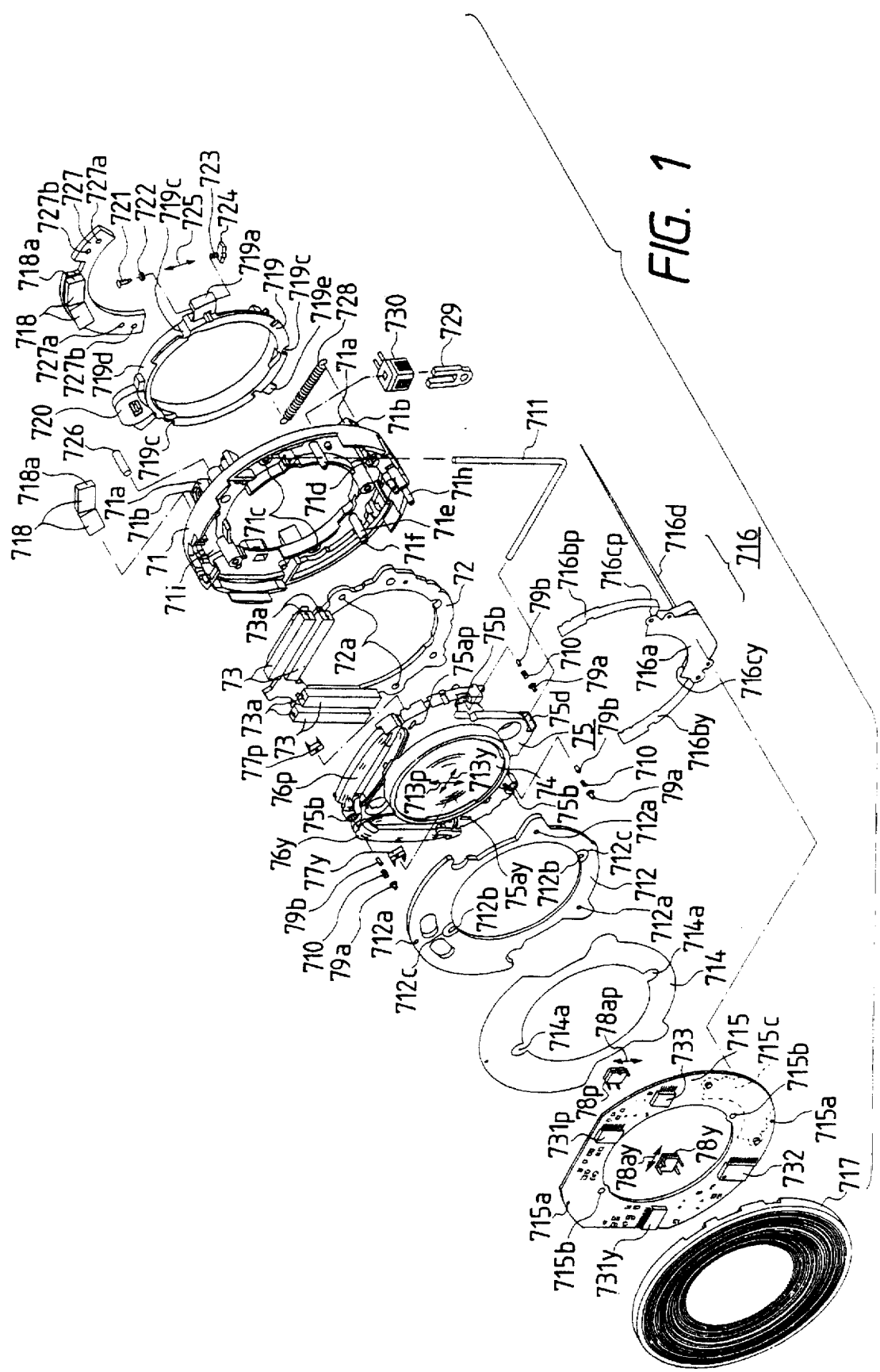
FIG. 1 is a perspective view showing the arrangement of the main part of an image blur prevention apparatus according to the first embodiment of the present invention.

FIG. 1 is a perspective view showing a portion of the lens barrel of an optical equipment using an image blur prevention system according to the first embodiment of the present invention. Referring to FIG. 1, rear lugs 71a (two of three rear lugs 71a are shown in FIG. 1) of a base 71 are fitted in a lens barrel (not shown). Known lens barrel rollers are screwed to holes 71b and fixed to the lens barrel.

A gloss-plated second yoke (fixed portion) 72 consisting of a magnetic material is screwed to holes 71c of the base 71 with screws extending through holes 72a formed along the circumference of the base 71. Permanent magnets 73 (shift magnets) consisting of a neodymium magnet or the like are magnetically attracted by the second yoke 72. Arrows 73a indicate the magnetization directions of the permanent magnets 73. A lens 74 is an optical element for image blur prevention. Coils 76p and 76y (shift coils) are attached to a support frame 75 in which the lens 74 is fixed with a C ring or the like. Light-emitting elements 77p and 77y such as IREDs are also bonded to the rear surface of the support frame 75. Light beams from the light-emitting elements 77p and 77y are incident on position detection elements 78p and 78y such as PSDs (to be described later) through slits 75ap and 75ay, respectively.

Figure 2:
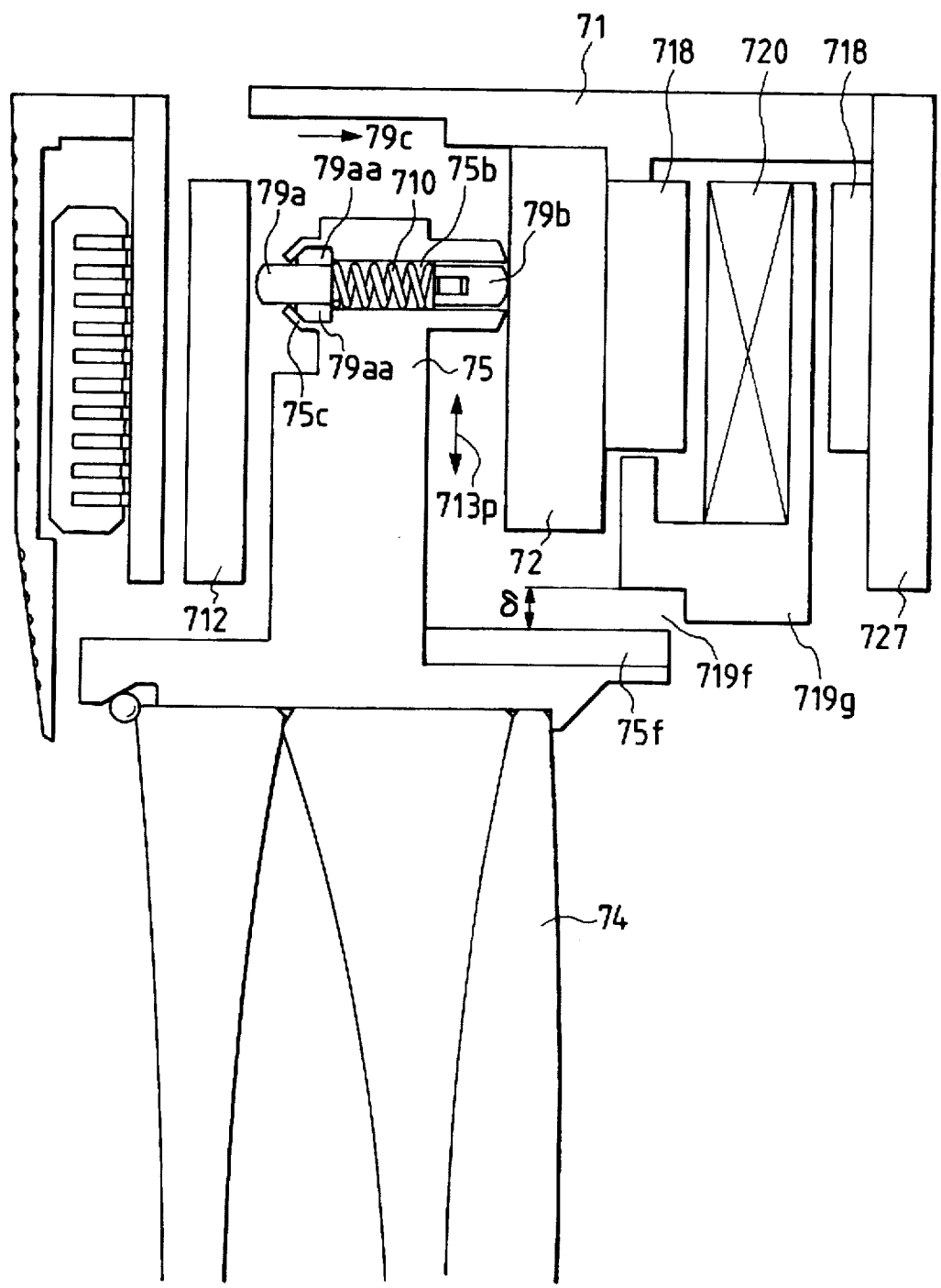
FIG. 2 is a sectional view showing a portion of the arrangement shown in FIG. 1.

As shown in FIG. 2, support balls 79a and 79b such as POMs having spherical ends and a charge spring 710 are inserted in a hole 75b (at three portions) of the support frame 75. The support ball 79a is thermally caulked and fixed to the support frame 75 (the support ball 79b can slide along the extension direction of the hole 75b against the spring force of the charge spring 710).

FIG. 2 is a cross sectional view of the assembled lens barrel. The support ball 79b, the charged charge spring 710, and the support ball 79a are inserted in this order into the hole 75b of the support frame 75 along a direction indicated by an arrow 79c (the support balls 79a and 79b have the same shape). Finally, a peripheral portion 75c of the hole 75b is thermally caulked to prevent the support ball 79a from being removed.

Figure 3:
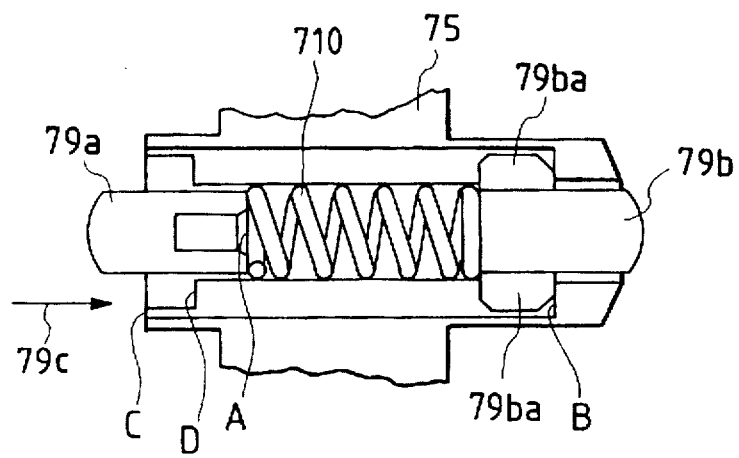
FIG. 3 is a view for explaining a portion of the arrangement shown in FIG. 2.

FIG. 3 is a sectional view of a portion taken along a direction perpendicular to the hole 75b shown in FIG. 2.

Figure 4:
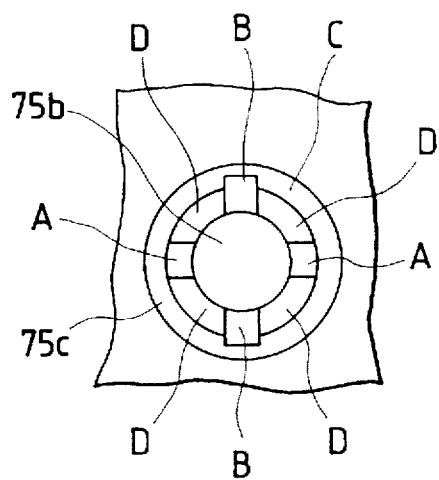
FIG. 4 is a plan view of a portion viewed from a direction indicated by an arrow 79c in FIG. 3.

FIG. 4 is a plan view of a portion viewed from the direction indicated by the arrow 79c in FIG. 3. Points A to D in FIG. 4 correspond to points A to D in FIG. 3. The rear end portion of a vane portion 79aa of the support ball 79a is received within the range up to a plane of depth A and regulated. With this arrangement, by thermally caulking the peripheral portion 75c, the support ball 79a is fixed to the support frame 75.

The distal end portion of a vane portion 79ba of the support ball 79b is received within the range up to a plane of depth B. With this arrangement, the support ball 79b is prevented from being removed from the hole 75b by the charge spring force of the charge spring in the direction indicated by the arrow 79c. When assembly of the lens barrel is completed, the support ball 79b is received by the second yoke 72. For this reason, the support ball 79b cannot be removed from the support frame 75a anymore, though the plane B is provided within the removal prevention range to facilitate assembly.

Referring to FIGS. 2 to 4, the shape of the hole 75b of the support frame 75 can be formed by a simple split mold which is removed in a direction opposite to the arrow 79c without using any complex inner slide mold even when the support frame 75 is to be formed by molding. The dimensional accuracy can be strictly set accordingly. Since the support balls 79a and 79b are parts in the same shape, a failure in assembly is prevented, and parts can be advantageously managed. Referring to FIG. 1, a bearing portion 75d of the support frame 75 is coated with fluorine-based grease. An L-shaped shaft 711 (non-magnetic stainless steel member) is inserted in the bearing portion 75d. The other end of the L-shaped shaft 711 is inserted in a bearing portion 71d formed in the base 71 (similarly coated with grease). With this arrangement, the support frame 75, mounted on the second yoke 72 together with the three support balls 79b, is contained in the base 71.

Figure 5:
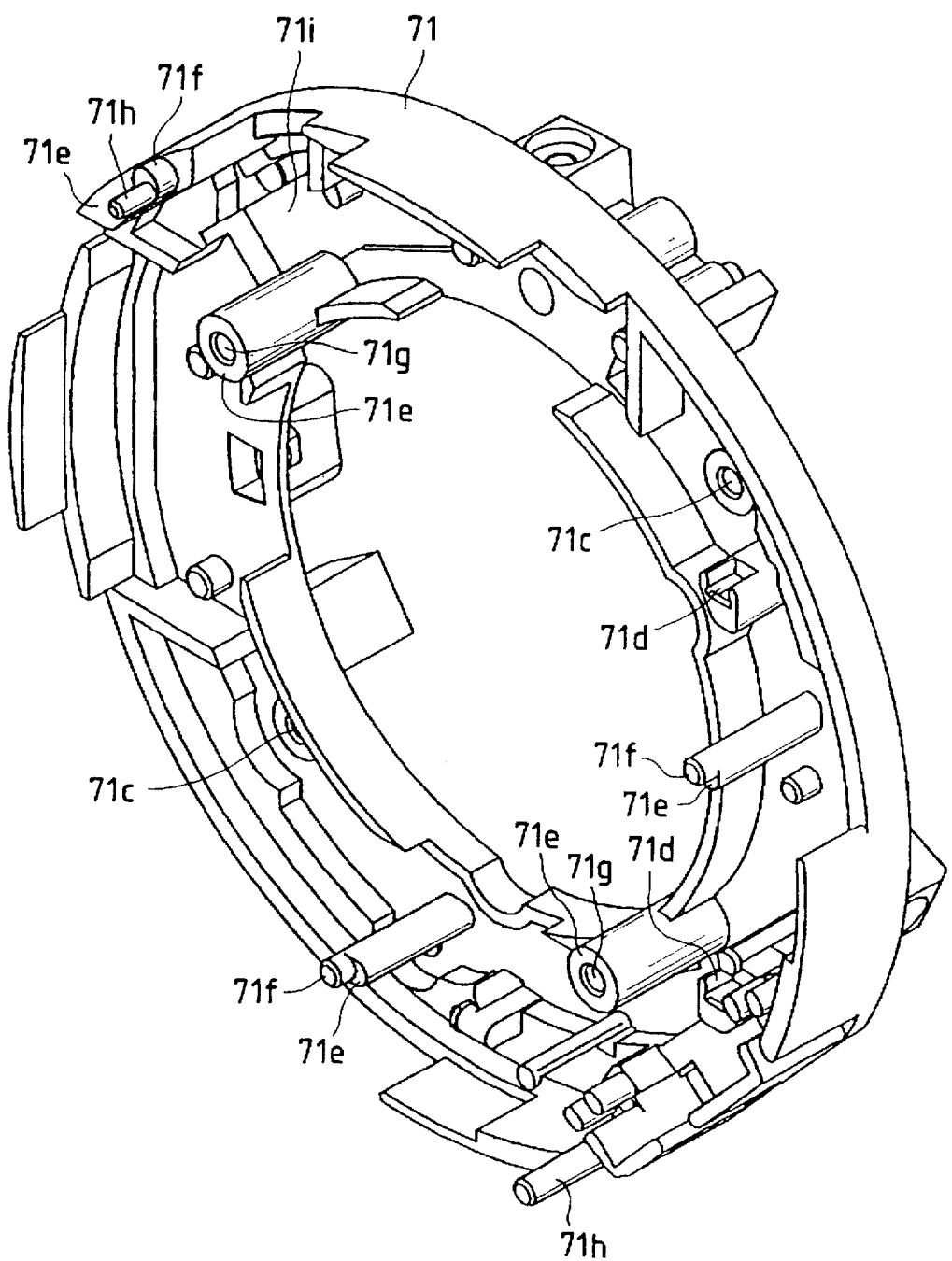
FIG. 5 is a perspective view of a portion of the arrangement shown in FIG. 1.

Positioning holes 712a (at three portions) of a first yoke 712 are fitted on pins 71f (at three portions in FIG. 5) of the base 71. The first yoke 712 is received by butt surfaces 71e (at five portions) and magnetically coupled to the base 71 (along the magnetization directions 73a of the permanent magnets 73). With this arrangement, the rear surface of the first yoke 712 contacts the support balls 79a. The support frame 75 is sandwiched between the first yoke 712 and the second yoke 72, as shown in FIG. 2, and positioned along the optical axis.

The fluorine-based grease is also applied to the contact surfaces between the support balls 79a and 79b, the first yoke 712, and the second yoke 72, so that the support frame 75 can freely slide within the plane perpendicular to the optical axis with respect to the base 71. The L-shaped shaft 711 supports the support frame 75 such that the support frame 75 can slide only in directions indicated by arrows 713p and 713y with respect to the base 71. With this arrangement, rotation (rolling) of the support frame 75 about the optical axis relative to the base 71 is regulated.

The fitting play between the L-shaped shaft 711 and the bearing portions 71d and 75d is set to be large along the optical axis, since regulation along the optical axis is already provided by clamping by the first yoke 712 and the second yoke 72 and the support balls 79a and 79b. The surface of the first yoke 712 is covered with an insulating sheet 714. A hard substrate 715 having a plurality of ICs (e.g., the position detection elements 78p and 78y, output amplifying ICs, coils (75p and 76y), and driving ICs) thereon has its positioning holes 715a (at two portions) fitted on pins 71h (at two portions in FIG. 5) of the base 71 and is coupled to the holes 712*b* of the first yoke 715*b* and holes 71*g* of the base 71 with screws.

Figure 6:
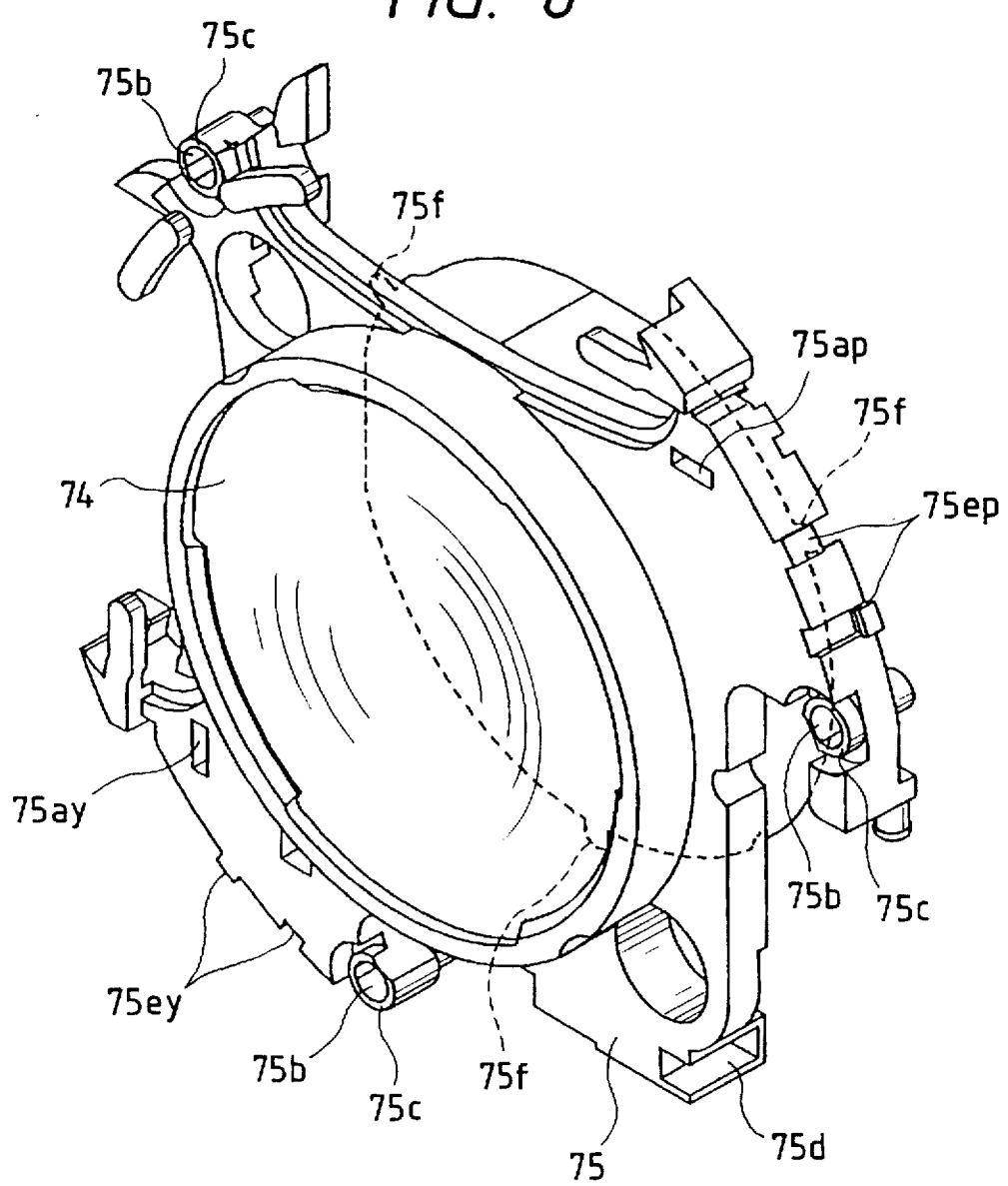
FIG. 6 is a perspective view of a portion of the arrangement shown in FIG. 1.

The position detection elements 78*p* and 78*y* are positioned on the hard substrate 715 by a jig and fixed by soldering. A flexible substrate 716 for signal transmission also has a surface 716*a* thermally adhered to the rear surface of the hard substrate 715 within a range 715*c* enclosed by a broken line. A pair of arms 716*bp* and 716*by* extend from the flexible substrate 716 along a plane perpendicular to the optical axis. As shown in FIG. 6, the arms are hooked to hook portions 75*ep* and 75*ey* of the support frame 75, and the terminals of the IREDs 77*p* and 77*y* and the terminals of the coils 76*p* and 76*y* are soldered to these arms.

The IREDs 77*p* and 77*y* and the coils 76*p* and 76*y* are driven from the hard substrate 715 through the flexible substrate 716. The arms 716*bp* and 716*by* of the flexible substrate 716 have bent portions 716*cp* and 716*cy*, respectively. The load on the arms 716*bp* and 716*by*, which is generated when the support frame 75 moves within the plane perpendicular to the optical axis, is reduced by the elasticity of the bent portions 716*cp* and 716*cy*.

The first yoke 712 has a projecting surface 712*c* formed by embossment. The projecting surface 712*c* is in direct contact with the hard substrate 715 through holes 714*a* of the insulating sheet 714. A ground (GND) pattern is formed on the hard substrate 715 side of this contact surface. By coupling the hard substrate 715 to the base 71 with screws, the first yoke 712 is grounded. Therefore, the first yoke 712 is prevented from serving as an antenna for applying noise to the hard substrate 715.

A mask 717 is positioned by the pins 71*h* of the base 71 and fixed on the hard substrate 715 with a double-sided tape. A through hole 71*i* for receiving a permanent magnet is formed in the base 71, through which the rear surface of the second yoke 72 is exposed. Permanent magnets 718 (lock magnets) provided on a yoke 727 are received by this through hole 71*i* and magnetically coupled to the second yoke 72 (FIG. 2).

Figure 7:
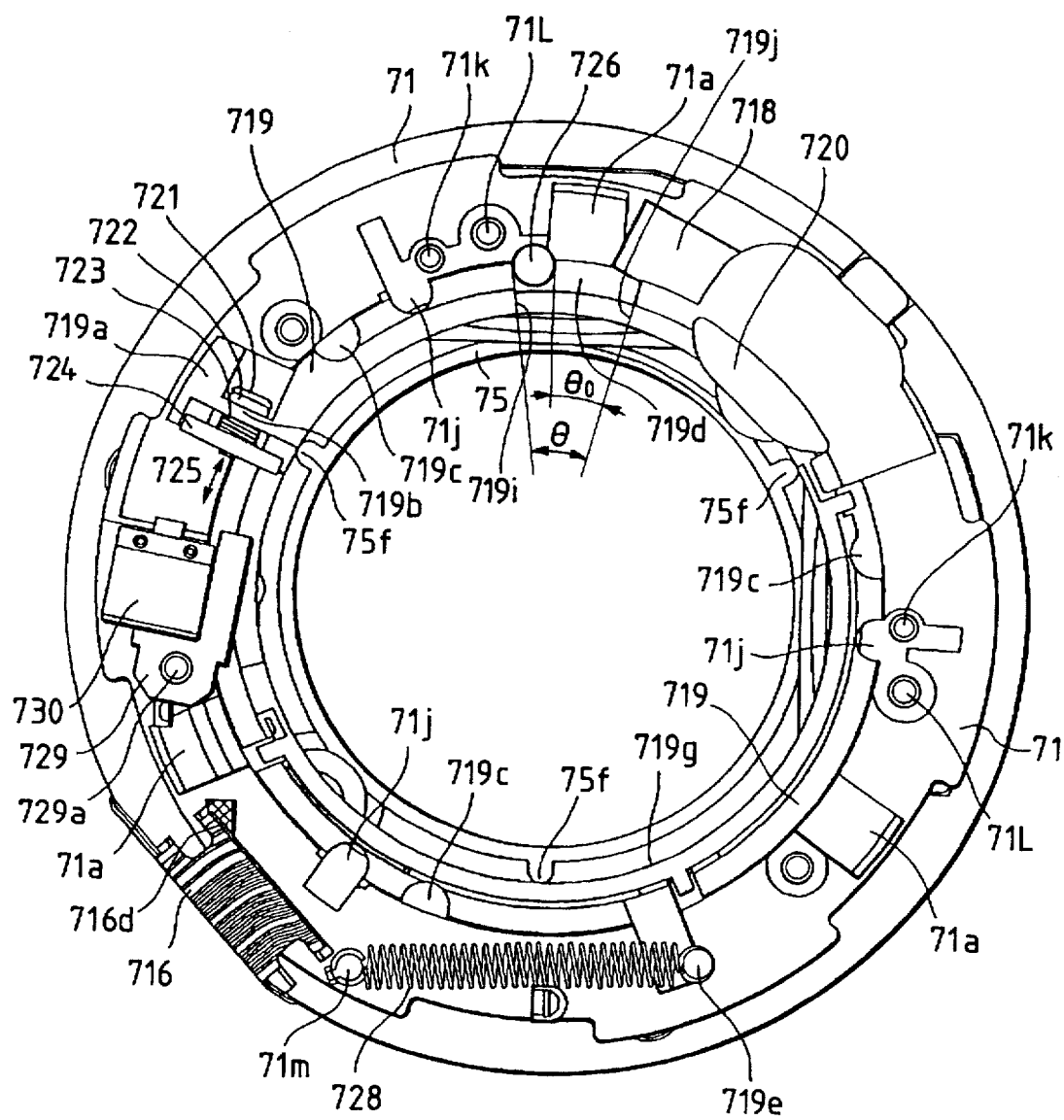
FIG. 7 is a plan view of a portion of the arrangement shown in FIG. 1.
Figure 8:
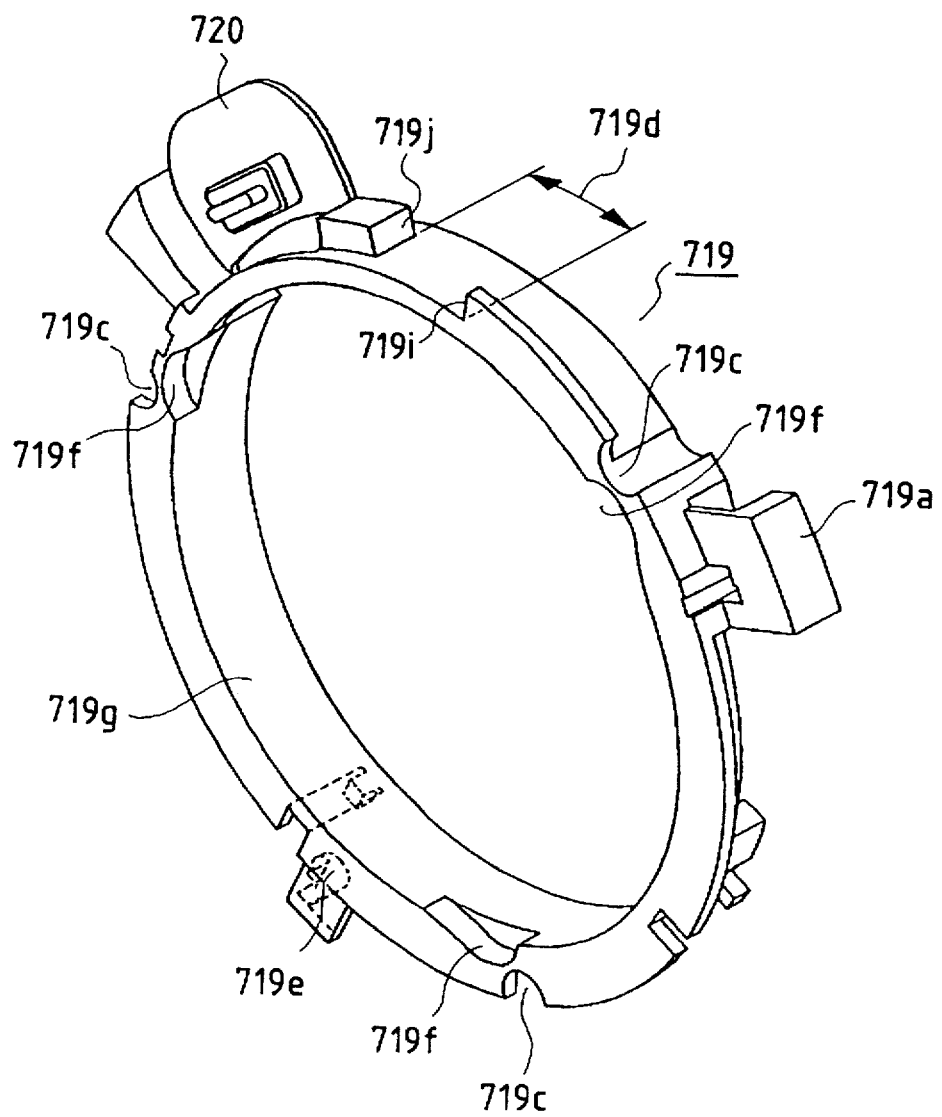
FIG. 8 is a perspective view of a portion of the arrangement shown in FIG. 1.

FIG. 7 is a plan view schematically showing the assembled lens barrel viewed from the rear direction of FIG. 1. Outer gap portions 719*c* (at three portions in FIG. 8) of a lock ring (lock portion) 719 are set in phase with inner projections 71*j* (at three portions) of the base 71, and the lock ring 719 is pressed into the base 71. Thereafter, the lock ring 719 is rotated in the unlock direction (counterclockwise in FIG. 7), thereby achieving bayonet coupling between the lock ring 719 and the base 71. With this arrangement, the lock ring 719 is restrained along the optical axis but can rotate about the optical axis with respect to the base 71.

A lock rubber (regulating member) 726 is arranged on the base 71 to prevent bayonet coupling from being disengaged when the lock ring 719 rotates to set the gap portions 719*c* of the lock ring 719 in phase with the projections 71*j* again. With this arrangement, rotation of the lock ring 719 is regulated only within the driving range (an angle θ₀ of a gap portion 719*d*) regulated by the lock rubber 726.

That is, if the lock rubber 726 is not arranged, the lock ring 719 has a wide driving range with respect to the base 71. With this arrangement as well, engagement and disengagement of bayonet coupling can be realized. However, when the lock rubber 726 is arranged to regulate the driving range up to the angle θ₀, the outer gap portions 719*c* cannot rotate to come in phase with the inner projections 71*j*. Therefore, bayonet coupling is prevented from being disengaged.

Figure 11:
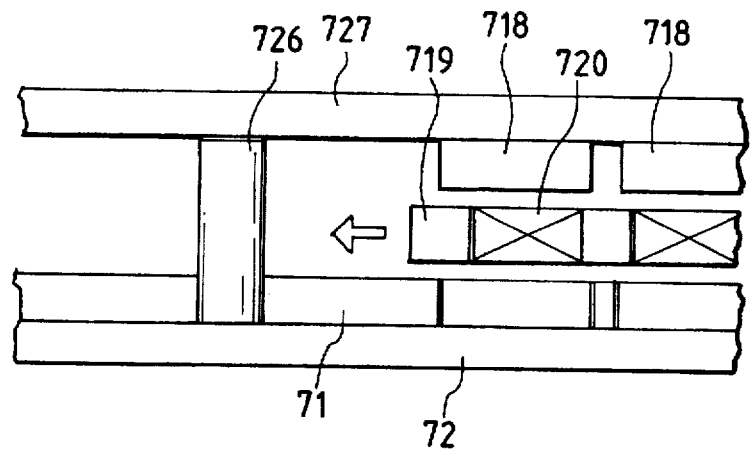
FIG. 11 is a sectional view of a portion of the arrangement shown in FIG. 1.

The lock rubber 726 is pressed into the hole (not shown) of the base 71 and stands upright from the base 71. The lock rubber 726 is regulated in the tilt direction by covering almost ½the perimeter of the base 71 with the rear lug 71*a* and a projecting portion formed, on the base 71, around a screw hole (self tapping hole) 71L of the base 71. In addition, a yoke 727 is coupled to the base 71 with screws to sandwich the lock rubber 726 between the yoke 727 and the second yoke 72, as shown in FIG. 11 (a schematic sectional view taken along the circumferential direction of FIG. 7). The elasticity of the rubber is slightly charged to prevent disengagement. With this arrangement, the lock rubber 726 is fixed to the base 71 without adding any screw or adhesive.

Figure 9:
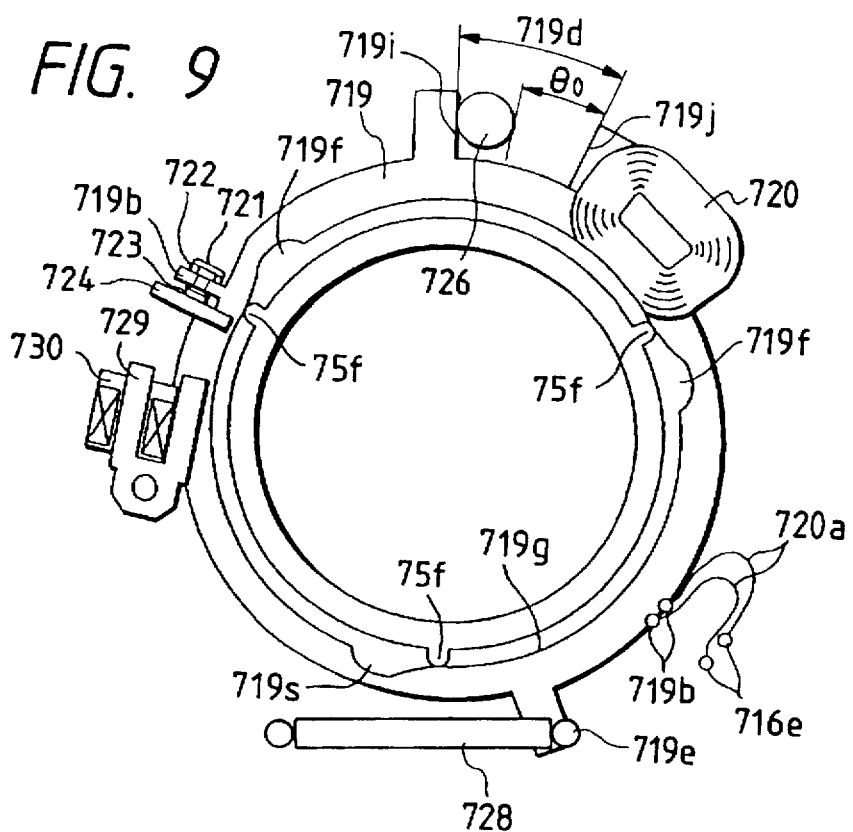
FIG. 9 is a plan view of a portion of the arrangement shown in FIG. 1.
Figure 10:
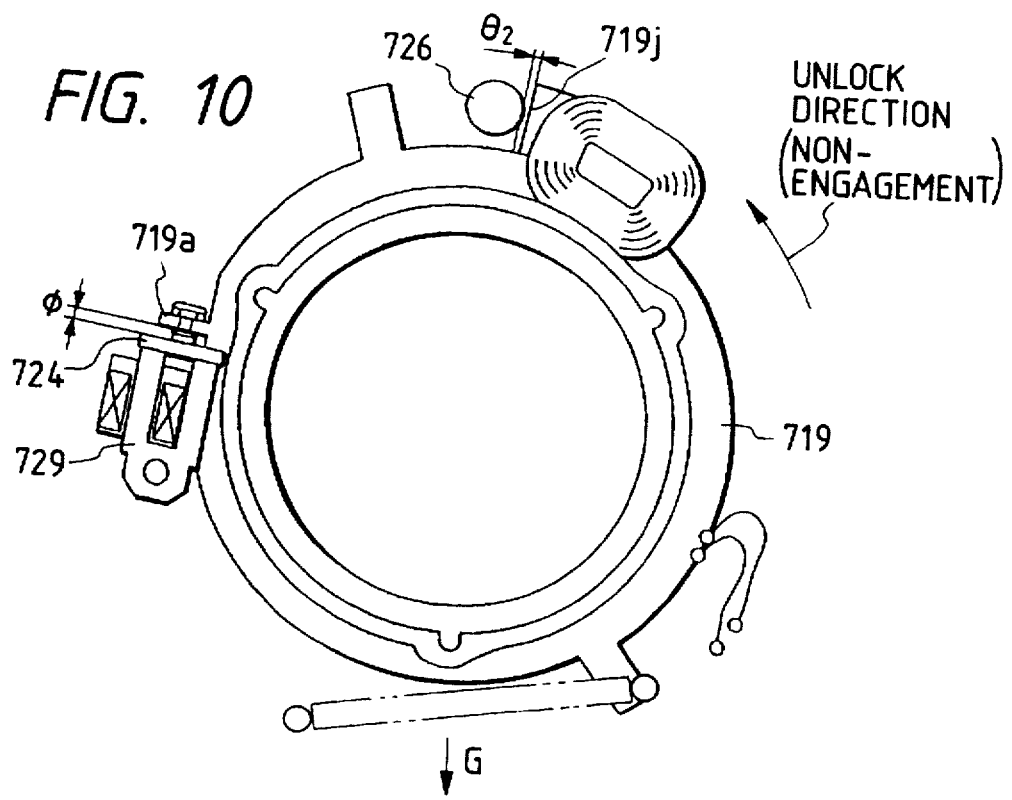
FIG. 10 is a plan view of a portion of the arrangement shown in FIG. 1.

The contact positional relationship between the lock rubber 726 and the lock ring 719 and the driving range of the lock ring 719 will be described below with reference to FIGS. 9 and 10. FIGS. 9 and 10 are plan views schematically showing only the pertinent part of the plan view of FIG. 7. For descriptive convenience, the shape and layout are slightly changed from the actually assembled state.

FIG. 9 is a plan view showing a locked state. Referring to FIG. 9, the lock ring 719 is biased clockwise by a lock spring 728. The lock rubber 726 contacts a side 719*i* of the lock ring 719 to restrain rotation of the lock ring 719. This function of the lock ring 719 is elastically attained by the rubber independent of the base 71, so that a shock generated in a lock operation is absorbed to prevent a loud sound. The side 719*i* which the lock rubber 726 contacts is arranged near a coil 720. In the lock ring 719, the mass particularly concentrates on the portion near the coil 720, so this portion has the largest inertial force upon rotation of the lock ring 719.

When rotation is restrained by a hook 719*e*, the lock ring 719 deforms because the hook 719*e* is separated from the coil 720. This deformation results in generation of an unpleasant sound and a discomfort when a shock is generated in a lock operation. In addition, the lock ring 719 easily comes off from the base 71 (because of patching coupling) by snap fitting. For this reason, in this embodiment, rotation of the lock ring 719 is elastically restrained at a portion near the coil 720 to obtain a buffer function. In addition, since the rotation is restrained at the mass concentration point, the lock ring 719 is prevented from deforming in a lock operation. Furthermore, the sound in a lock operation is small and not unpleasant.

Bayonet coupling is firmer than coupling by snap fitting. In addition, since the lock ring 719 is prevented from deforming, the lock ring 719 is not removed from the base 71. The lock ring 719 is driven in the lock and unlock directions. This driving range is regulated, and the sound in stopping is generated in both the directions.

However, immediately before driving in the unlock direction is completed, an armature 724 abuts against an attraction yoke 729 with a small force (by the elastic force of an armature spring 723). At this time, a small metallic sound is generated, though no sound is generated when driving is completed because of the elasticity of the armature spring 723. Since the metallic sound is generated in synchronism with a release operation (when the image blur prevention system is ON) by the photographer, he/she hardly feels any discomfort. With the above arrangement, the sound generated in a lock operation is made small.

In this embodiment, as described above, the lock rubber 726 is arranged and is made abut against the lock ring 719 near the coil 720. In this embodiment, (A1) the lock ring 719 having a biasing spring in the lock direction is (A2) inserted in the base 71 while being rotated in the lock direction (clockwise) and (A3) then rotated in the unlock direction to engage bayonet coupling, so that the lock ring 719 is prevented, with the lock rubber, from being removed.

With the three arrangements described above, (B1) the lock ring can be stably coupled to the base with a simple bayonet disengagement prevention structure, (B2) the sound generated in a lock operation can be minimized, and (B3) by arranging the lock rubber near the coil, the lock ring can be prevented from deforming to prevent generating of an unpleasant sound in a lock operation.

The lock rubber 726 according to the present invention also serves as a stopper in an unlock operation of the lock ring 719.

FIG. 10 is a plan view schematically showing a state in which the lock ring 719 is rotated in the unlock direction, and the armature 724 just abuts against the attraction yoke 729. At this time, $$\theta_2 < \phi$$

where $\theta_2$ is the clearance between the outer surface of the lock rubber 726 and a side 719j of the lock ring, and $\phi$ is the clearance between a lock ring lug 719a and the armature 724 (the driving margin for equalizing the armature 724 with the attraction yoke 729).

More specifically, without the side 719j, $$\theta_1 - \phi < \theta_0 < \theta_1$$

where $\theta_1$ is the driving angle of the lock ring 719 from the state in FIG. 9 to the state in FIG. 10 (a state in which the driving margin becomes zero).

Even when the lock ring 719 is continuously driven in the unlock direction in the state shown in FIG. 10, the lock rubber 726 elastically abuts against the side 719j before the lock ring lug 719a presses the armature 724 against the attraction yoke 729. Therefore, the armature 724 is properly attracted by the attraction yoke 729.

As described above, a stopper for regulating rotation in both the directions is arranged. The stopper consists of one elastic means. The stopper is fixed upon only being sandwiched between parts of members. The stopper also serves as a bayonet disengagement preventing device. With this arrangement, the operability in assembly is improved, and no unpleasant sound is generated in an operation, so that a stable mechanism and a lock means (lock device) which properly operates can be obtained.

The mechanical portions of the above lens barrel can be roughly classified as follows. The lens 74, the support frame 75, the coils 76p and 76y, the IREDs 77p and 77y, the support balls 79a and 79b, the charge spring 710, and the support shaft 711 constitute one element of an optical holding means (correction means) for decentering the optical axis. The base 71, the second yoke 72, the permanent magnets 73, and the first yoke 712 constitute one element of a support means for supporting the correction means. The permanent magnet 718, the lock ring 719, the coil 720, an armature shaft 721, an armature rubber 722, the armature spring 723, the armature 724, the yoke 727, the lock spring 728, the attraction yoke 729, and an attraction coil 730 constitute one element of a lock means for locking the correction means. The armature 724, the yoke 729, and the coil 730 constitute one element of a holding portion. The armature shaft 721, the armature rubber 722, and the armature spring 723 constitute one element of an equalizing means.

Figure 12:
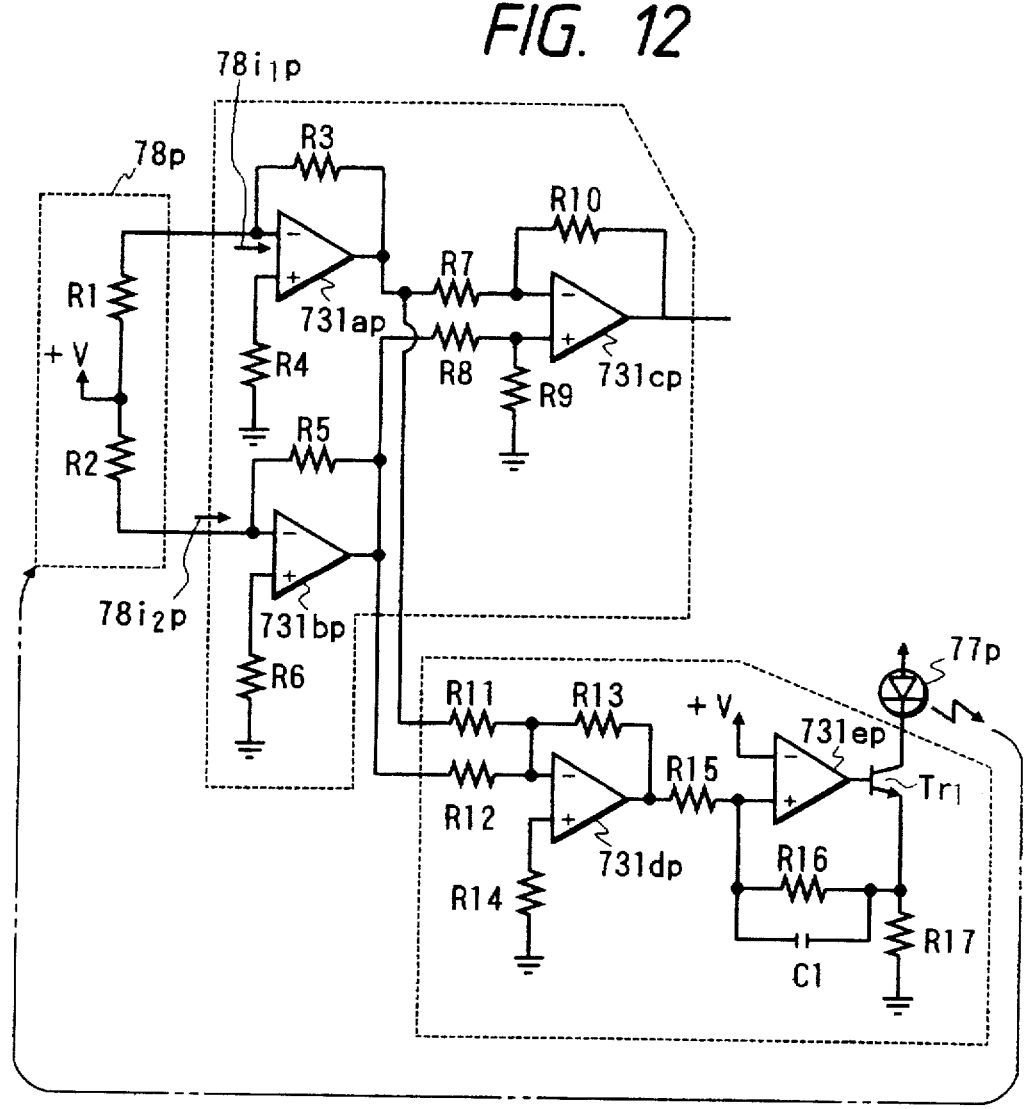
FIG. 12 is a circuit diagram showing the circuit arrangement of the first embodiment of the present invention.

Referring back to FIG. 1, ICs 731p and 731y on the hard substrate 715 are ICs for amplifying the outputs from the position detection elements 78p and 78y, respectively. FIG. 12 is a circuit diagram for explaining the internal arrangement (since the ICs 731p and 731y have the same arrangement, only the IC 731p is shown in FIG. 12).

Referring to FIG. 12, current-to-voltage conversion amplifiers 731ap and 731bp convert photocurrents $78_{i1p}$ and $78_{i2p}$ generated in the position detection element 78p (consisting of resistors $R_1$ and $R_2$) by the light-emitting element 77p into voltages, respectively. A differential amplifier 731cp obtains a differential output between the current-to-voltage conversion amplifiers 731ap and 731bp and amplifies the differential output.

Light beams emitted from the light-emitting elements 77p and 77y are incident on the position detection elements 78p and 78y through the slits 75ap and 75ay, as described above. When the support frame 75 moves within a plane perpendicular to the optical axis, the incident positions on the position detection elements 78p and 78y change. The position detection element 78p has sensitivity in a direction indicated by an arrow 78ap. The slit 75ap has a shape with which the entering light beam diverges in a direction perpendicular to the arrow 78ap (in a direction indicated by an arrow 78ay) and converges in the direction indicated by the arrow 78ap.

For this reason, only when the support frame 75 moves in the direction indicated by the arrow 713p, the balance between the photocurrents $78_{i1p}$ and $78_{i2p}$ from the position detection element 78p changes, so that the differential amplifier 731cp outputs a signal corresponding to the direction indicated by the arrow 713p of the support frame 75. The position detection element 78y has detection sensitivity in the direction indicated by the arrow 78ay. The slit 75ay has a shape extending along a direction perpendicular to the arrow 78ay (the direction indicated by the arrow 78ap). For this reason, only when the support frame 75 moves in the direction indicated by the arrow 713y, the position detection element 78y changes its output.

A summing amplifier 731dp obtains the sum of outputs from the current-to-voltage conversion amplifiers 731ap and 731bp (the sum of the light-receiving amounts of the position detection element 78p). Upon receiving this signal, a driving amplifier 731ep drives the light projection element 77p in accordance with the signal.

Since the light-emitting amount from the light-emitting element 77p unstably changes due to the temperature or the like, the absolute amount $78_{i1p} + 78_{i2p}$ of the photocurrents $78_{i1p}$ and $78_{i2p}$ from the position detection elements 78p and 78y changes accordingly. For this reason, the output from the differential amplifier 731cp, i.e., $78_{i1p} - 78_{i2p}$, representing the position of the support frame 75 also changes.

Therefore, the light-emitting element 77p is controlled by the above-described driving circuit such that a constant light-receiving amount sum is obtained, thereby eliminating a change in output from the differential amplifier 731cp.

The coils 76p and 76y shown in FIG. 1 are positioned in a closed magnetic circuit formed by the armature shaft 721 and the second yoke 72. When current flows to the coil 76p, the support frame 75 is driven in the direction indicated by the arrow 731p (known from Fleming's left-hand rule). When current flows to the coil 76y, the support frame 75 is driven in the direction indicated by the arrow 713y.

Generally, the outputs from the position detection elements 78p and 78y are amplified by the ICs 731p and 731y.

When the coils 76p and 76y are driven in accordance with the outputs, the support frame 75 is driven to change the outputs from the position detection elements 78p and 78y. When the driving directions (polarities) of the coils 76p and 76y are set in a direction to decrease the outputs from the position detection elements 78p and 78y (negative feedback), the support frame 75 is stabilized by the driving forces of the coils 76p and 76y at a position where the outputs from the position detection elements 78p and 78y become substantially zero.

With this method of performing driving using negative feedback of the outputs from the position detection elements 78p and 78y (to be referred to as a position control method), when a target value (e.g., a hand fluctuation angle signal) is externally set in the ICs 731p and 731y, the support frame 75 is driven accurately in accordance with the target value.

In fact, the outputs from the differential amplifiers 731cp and 731cy are sent to a main substrate (not shown) through the flexible substrate 716, subjected to analog/digital conversion (A/D conversion), and a clussed by a microcomputer. In the microcomputer, the outputs are appropriately compared with the target value (hand fluctuation angle signal) and amplified. After phase advance compensation is performed by a digital filter method (to further stabilize position control), the signal is input to an IC 732 (for driving the coils 76p and 76y) through the flexible substrate 716.

On the basis of the input signal, the IC 732 performs PWM (pulse width modulation) driving of the coils 76p and 76y, thereby driving the support frame 75. The support frame 75 is slidable in the directions indicated by the arrows 713p and 713y, and the position of the support frame 75 is stabilized by the above-described position control method. In commercial optical equipment such as a camera, the support frame 75 is not always controlled from the viewpoint of power savings. Since the support frame 75 can freely move within a plane perpendicular to the optical axis in a non-controlled state, the following countermeasures are taken against shock sound generation or damage at the stroke end.

As shown in FIGS. 6 to 10, the rear surface of the support frame 75 has three projections 75f which radially project. As shown in FIG. 7 or 9, the distal ends of the projections 75f are fitted in an inner wall 719g of the lock ring 719. With this arrangement, the support frame 75 is restrained in all directions with respect to the base 71.

Figure 13:
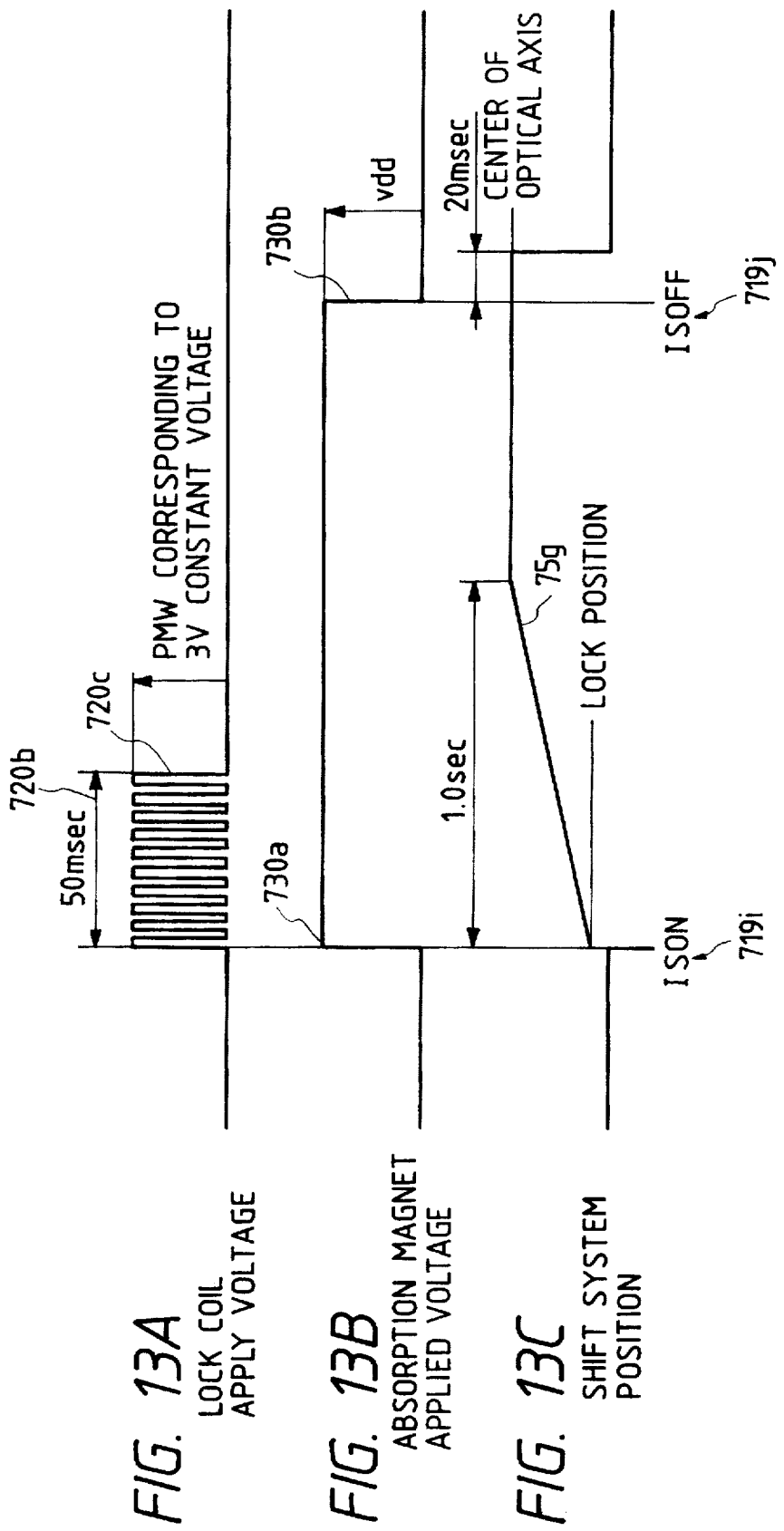
FIGS. 13A to 13C are timing charts for explaining the operation of the first embodiment of the present invention.

FIGS. 13A to 13C are timing charts of mechanical lock ring driving. At a point indicated by an arrow 719i, the coil 720 is energized (PWM driving indicated by reference numeral 720b). At the same time, the attraction magnet 730 is also energized (730a). For this reason, when the armature 724 abuts against the attraction yoke 729 and equalized, the armature 724 is attracted by the attraction yoke.

When energization to the coil 720 is stopped at a time indicated by reference numeral 720c, the lock ring 719 is about to be rotated clockwise by the force of the lock spring 728. However, since the armature 724 is attracted by the attraction yoke 729, as described above, rotation is regulated. At this time, since the projections 75f of the support frame 75 oppose cams 719f (the cams 719f rotate), the support frame can move only by an amount corresponding to the clearance between the projection 75f and the cam 719f.

The support frame 75 falls in the direction of gravity G. However, since the support frame 75 is set in a controlled state at the time indicated by the arrow 719i in FIGS. 13A to 13C, the support frame 75 does not fall. The support frame 75 is restrained by the inner wall of the lock ring 719 in a non-controlled state. In fact, there is a play corresponding to the fitting play between the projections 75f and the inner wall 719g. More specifically, the support frame 75 falls downward in the direction of gravity by the amount of play, so that the center of the support frame 75 is shifted from that of the base 71. Therefore, from the time indicated by the arrow 719i, control is performed to slowly move the support frame 75 to the center of the base (the center of the optical axis) over e.g., one second.

If the support frame is abruptly moved to the center, the photographer perceives the fluctuation of the image through the lens 74, resulting in discomfort. Therefore, a degradation in image caused by the movement of the support frame 75 is prevented with the control as described above even when an exposure operation is performed during this time (e.g., the support frame is moved by 5 μm over ⅛second). More specifically, the outputs from the position detection elements 78p and 78y at the time indicated by the arrow 719i are stored. Control of the support frame 75 is started using the output values as target values. Thereafter, the support frame 75 is moved to predetermined target values for the center of the optical axis over one second (75g). After the lock ring 719 is rotated (unlock state), the support frame 75 is driven on the basis of the target values from the fluctuation detection means (combined with the above-described central position moving operation for the support frame), thereby starting image blur prevention.

To end image blur prevention, the image blur prevention system is turned off at a time indicated by an arrow 719j. Then, the target values from the fluctuation detection means are not input to the apparatus anymore. The support frame 75 is controlled to the central position and stopped. At this time, energization to the attraction coil 730 is stopped (730b). The attraction force of the armature 724 of the attraction yoke 729 is lost, so that the lock ring 719 is rotated clockwise by the lock spring 728, and the state shown in FIG. 9 is restored. At this time, the lock ring 719 abuts against the lock rubber 726, and its rotation is regulated. Thereafter (e.g., after 20 msec), control of this apparatus is stopped, and the timing charts shown in FIGS. 13A to 13C are ended.

Figure 14:
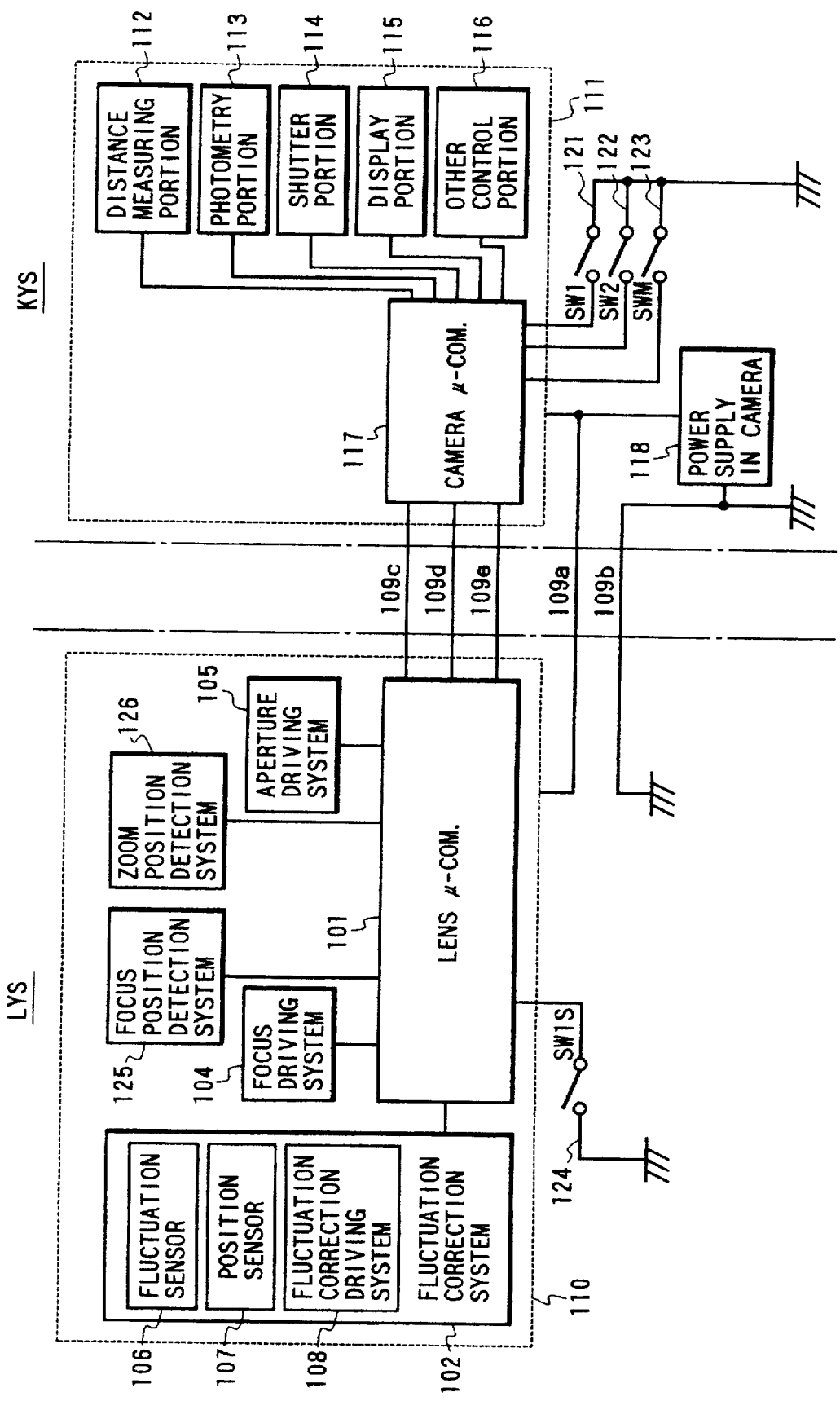
FIG. 14 is a block diagram schematically showing the arrangement of a portion of the first embodiment of the present invention.
Figure 15:
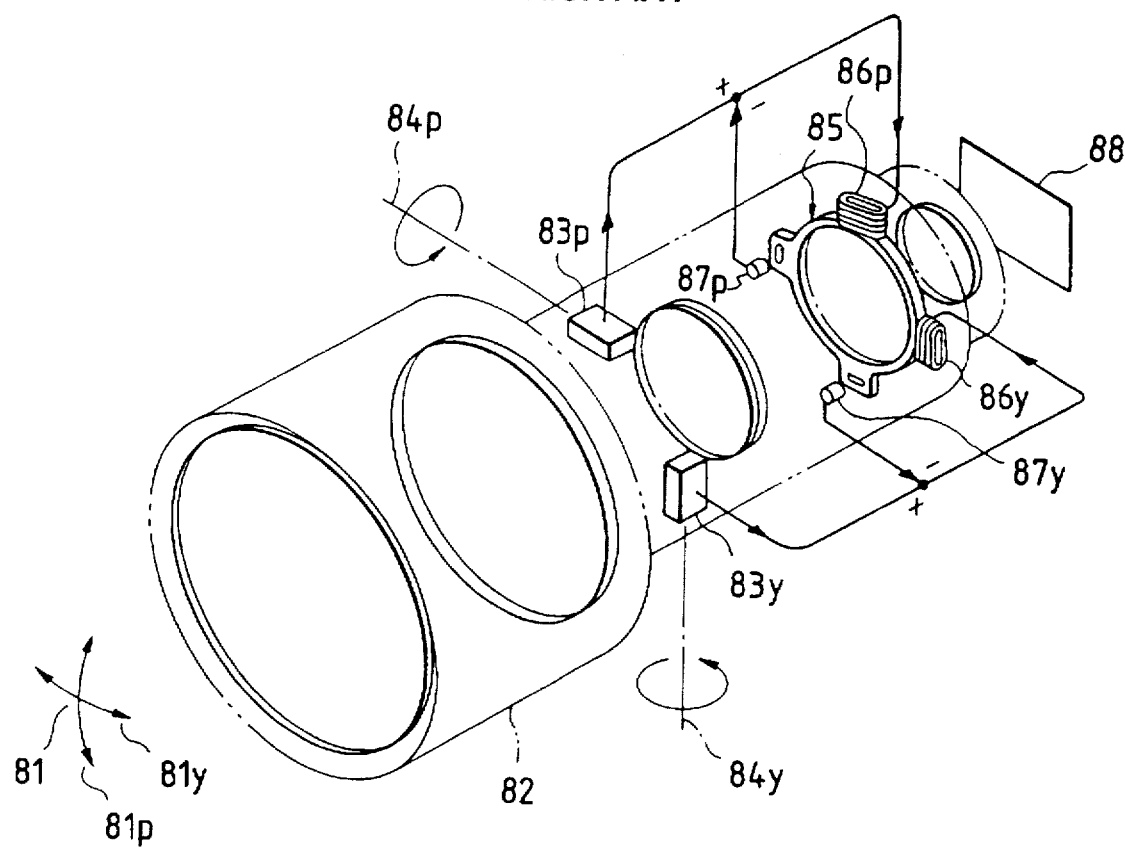
FIG. 15 is a perspective view showing the arrangement of a portion of a conventional lens barrel.

FIG. 14 is a block diagram showing a portion of the optical equipment according to the first embodiment of the present invention. FIG. 15 shows an application to a single reflex camera as an optical equipment. Referring to FIGS. 14 and 15, the camera includes a lens barrel (lens) LYS and a camera main body (camera body) KYS. A microcomputer (lens microcomputer) 101 has a control means, a change means, and the like arranged on the lens barrel side. The microcomputer 101 receives a communication through contacts 109c (for clock signals) and 109d (for transmitting a signal from the body to the lens) for communication from the camera body side, and on the basis of the instruction value, operates a fluctuation correction system (fluctuation detection means) 102, a focus driving system 104, and an aperture driving system 105 or controls the fluctuation correction system 102.

The fluctuation correction system 102 comprises a fluctuation sensor 106 for detecting a fluctuation, a position sensor 107 for detecting a displacement of the correction lens, and a fluctuation correction driving system 108 for performing image blur correction by driving the correction lens in accordance with a control signal calculated by the microcomputer 101 on the basis of outputs from the fluctuation sensor 106 and the position sensor 107.

A switch 124 (also to be indicated by reference symbol SWIS) is an image blur correction operation switch for selecting an image blur correction operation. To select an image blur correction operation, this switch SWIS is turned on.

The focus driving system 104 drives a lens for focusing (focus lens) in accordance with an instruction value from the microcomputer 101 and performs focusing. The aperture driving system 105 performs an operation of closing the stop to a set position or restoring an open state of the stop in accordance with an instruction value from the lens microcomputer 101.

The lens microcomputer 101 also transmits the state in the lens (e.g., the zoom position, the focus position, and the state of the aperture value) or information associated with the lens (e.g., the open aperture value, the focal length, and data necessary for distance measuring calculation) to the camera body side through a contact 109e for communication (for transmitting a signal from the lens to the body side).

The lens microcomputer 101, the fluctuation correction system 102, the focus driving system 104, and the aperture driving system 105 constitute a lens electrical system 11L0. Power is supplied from a power supply 118 in the camera to the lens electrical system 110 through a contact 109a and a ground contact 109b.

The camera body incorporates, as an electrical system 111 in the camera body, a distance measuring portion 112, a photometry portion 113, a shutter portion 114, a display portion 115, other control portions 116, and a camera microcomputer 117 for performing management of the start/ stop of the operations of these portions, exposure calculation, distance measuring calculation, and the like. Power for the electrical system 111 in the camera is also supplied from the power supply 118 in the camera.

A switch 121 (also indicated by reference symbol SW1) is used to start photometry or distance measurement. A release switch 122 (also indicated by refernece symbol SW2) is used to start a release operation. These switches general constitute a two-stroke switch. That is, the switch SW1 is turned on at the first stroke position, and the release switch SW2 is turned on at the second stroke position. An exposure mode. The exposure mode can also be changed by simultaneously operating the switch 123 and other operation members.

An operation on an interchangeable lens (lens barrel) side of the camera (optical equipment) with the above arrangement will be described below. The lens microcomputer 101 operates as shown in the flow chart of FIG. 16, thereby controlling the lens. In this embodiment, the correction lens is operated in accordance with an output from the fluctuation sensor. At the same time, by fluctuating the correction lens, the friction generated between the correction lens and members for supporting the correction lens is changed from static friction to dynamic friction to reduce the frictional force (to be referred to as fluidizing hereinafter). With this operation, the correction lens is smoothly moved, thereby preventing an image blur from remaining uncorrected. The operation will be described in accordance with FIG. 16. When a certain operation is performed on the camera side, e.g., when the switch SW1 is turned on, communication from the camera to the lens is performed, so that the lens microcomputer 101 starts the operation in step #1. [Step #1] Initial setting for lens control and image blur correction control is performed. [Step #2] Focus driving is performed by the focus driving system 104 on the basis of an instruction from the camera. [Step #3] Zoom/focus position detection is performed by a zoom position detection system 126 and a focus position detection system 125. [Step #4] Lock/unlock control of the fluctuation correction system 102 is performed on the basis of communication from the camera and the state of the switch SWIS. [Step #5] It is determined whether a HALT (stop all actuator driving in the lens) command is received from the camera. [Step #6] HALT control is performed. In this case, all driving is stopped to set the microcomputer in a sleep (halt) state.

Figure 17B:
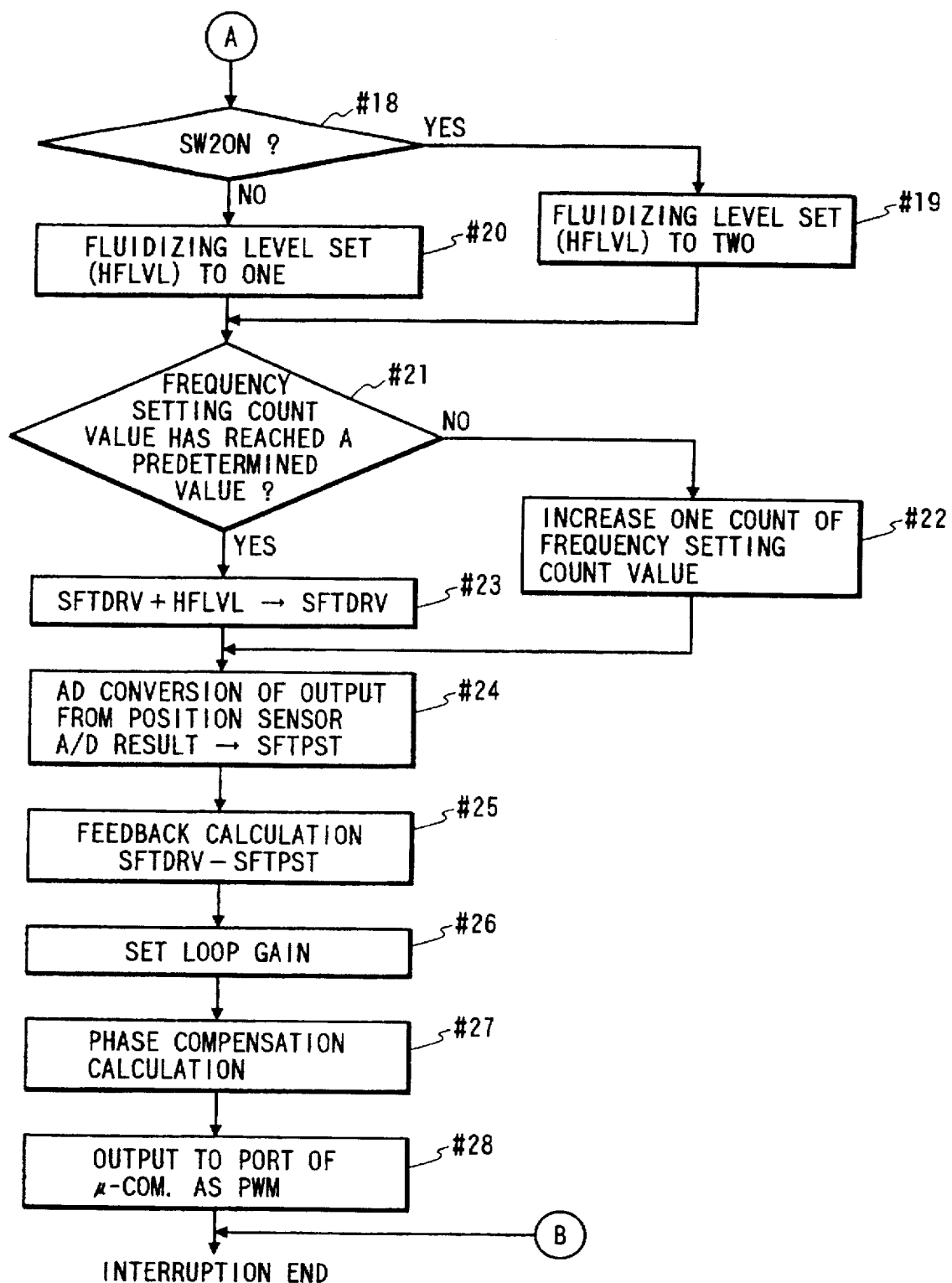
FIG. 17, which is comprised of FIGS. 17A and 17B, is a flow chart showing the operation according to the first embodiment of the present invention.

If a request for a serial communication interruption or image blur correction control interruption is received upon communication from the camera during these operations, interrupt processing is performed. In serial communication interrupt processing, decoding of communication data and lens processing such as aperture driving are performed. By decoding communication data, the ON state of the switch SW1, the ON state of the switch SW2, the shutter speed, and the like can be determined. An image blur correction interruption is generated at a predetermined period. FIGS. 17A and 17B are flow charts showing the interrupt processing operation, and the operation will be described below. If an interruption starts during the main operation of the camera, the lens microcomputer 101 starts image blur correction control in step #11 in FIG. 17A. [Step #11] The output from an angular velocity sensor, i.e., the fluctuation sensor 106 is accessed and A/D-converted. [Step #12] It is determined whether image blur correction is to be performed. For example, in a system which starts image blur correction in accordance with and AND of the ON state of the switch SWIS and the ON state of the switch SW1, this determination is made in the main routine. The determination result is reflected on a flag (not shown), and determination is performed on the basis of this flag. If YES in step #12, the flow advances to step #14. If NO in step #12, the flow advances to step #13. [Step #13] In this case, image blur correction is not performed. Therefore, high-pass filter/integral calculation are initialized, and the flow advances to step #29. [Step #29] Driving of the correction lens is stopped, and the interruption is ended. [Step #14] In this case, image blur prevention is performed. For this purpose, high-pass filter calculation is performed. [Step #15] Subsequently, integral calculation is performed. The calculation result corresponds to an angular displacement. [Step #16] Since the eccentric amount (sensitivity) of the correction lens with respect to the fluctuation angular displacement changes in accordance with the zoom/focus position, adjustment is performed using the zoom/focus position detected in step #3. [Step #17] The calculation result (image blur correction driving data) obtained in step #16 is stored in the RAM area set by SFTDRV in the microcomputer. [Step #18] The state of the switch SW2 is determined. In this case as well, the state of the switch SW2 determined on the basis of communication from the camera is reflected on a flag, and determination is performed in accordance with this flag. If YES in step #18, the flow advances to step #19. If NO in step #18, the flow advances to step #20. [Step #19] Since the switch SW2 is ON, i.e., an exposure operation is being performed, the fluidizing level (set at HFLVL of the RAM) is set to be 2 to improve the characteristics. [Step #20] Since the exposure operation is not being performed, the fluidizing level (set at HFLVL of the RAM) is set to be 1 to minimize the fluctuation transmitted to the photographer.

Generally, the fluidizing effect becomes larger as the amplitude of the fluctuation increases or as the frequency of the fluctuation is higher. In this embodiment, the effect is increased/decreased by changing the magnitude of the amplitude. The fluidizing level means the magnitude of the amplitude of the fluctuation for fluidizing. At level 2, the fluctuation has an amplitude larger than that at level 1. [Step #21] It is determined whether the setting period of fluidizing is reached. To perform fluidizing at a predetermined period during an interruption at a period of 500 μsec, the number of times of interruptions is counted. When the count value reaches the set period value, the timing for fluidizing can be set. [Step #22] Since the timing of fluidizing is not reached, the count of the number of times of interruptions is incremented by one. [Step #23] Since the timing of fluidizing is reached, HFLVL is added to SFTDRV to generate image blur correction driving data. The count of fluidizing is reset to zero. [Step #24] The output from the position sensor for the correction lens is A/D-converted. The result is stored in SFTPST of the RAM. [Step #25] Feedback calculation (SFTDRV−SFTPST) is performed. [Step #26] The loop gain is multiplied with the calculation result obtained in step #25. [Step #27] Phase compensation calculation is performed to stabilize the control system. [Step #28] The result obtained in step #27 is output to the port of the microcomputer as PWM and input to a coil driver for driving the correction lens. The correction lens is driven. The friction is minimized by fluidizing, and the correction lens is prevented from awkwardly moving by the friction. In this state, the image blur is corrected, and the interruption is ended.

With the above operation, except during an exposure operation, i.e., when the shooting result is not adversely influenced, the fluidizing level is set to be low (may be zero, as a matter of course) to minimize the fluctuation transmitted to the photographer because the characteristics can be somewhat degraded. During an exposure operation for a short time, the fluidizing level is set to be relatively high, thereby improving the shooting result without making the photographer feel discomfort due to a fluctuation.

As the amplitude of the fluctuation for fluidizing increases, the effect of reducing the frictional force increases. However, when the amplitude is excessively increased, the fluctuation appears as an image blur, resulting in a degradation in optical performance. In this embodiment, therefore, to eliminate an adverse influence on the image, the amplitude of the correction lens is set such that the image is moved within the range of 50 µm (preferably within the range of 10 µm) at maximum.

As for the frequency as well, as the frequency becomes higher, the effect of reducing the frictional force increases. To generate a fluidizing effect in the correction system for image blur correction of a camera as in this embodiment, the correction lens must be fluctuated at a frequency of at least 50 Hz.

When an image whose image blur has been corrected is used as a finder image, and a fluctuation at a frequency of 50 Hz or less (e.g., at the frequency of a normal hand fluctuation, i.e., 10 Hz) is generated, the fluctuation easily becomes visible to the user and makes the user feel discomfort. Therefore, the correction lens is preferably fluctuated at a frequency so that the fluctuation is not visible to the user. From this viewpoint as well, a fluctuation at a frequency of 50 Hz or more is preferable.

As described above, as the frequency of the fluctuation for fluidizing becomes higher, the effect of reducing the frictional force increases. On the other hand, when the frequency is raised beyond the resonance frequency of the control system, the control system cannot follow up the driving signal, resulting in a decrease in response amplitude (as described above, as the amplitude decreases, the frictional force reduction effect decreases). Therefore, the upper limit of the frequency is determined on the basis of the performance of the control system. Generally, in the control system for performing image blur correction of the camera as in this embodiment, a frequency of about 300 Hz or less (a frequency not so different from the resonance frequency of the control system) is preferably used.

The second embodiment of the present invention will be described below. In the first embodiment, the fluidizing level (the amplitude of the fluctuation) is directly changed. In the second embodiment, the amplitude is indirectly changed by changing the period of a fluctuation. The above-described lens barrel having an image blur correction mechanism of the present invention is a control system of a higher order, and its closed loop characteristic has a resonance point near 160 Hz. Therefore, even at the same input amplitude, when the frequency of a fluctuation for fluidizing is close to 160 Hz, i.e., equals the resonance frequency of the control system, the response amplitude is maximized, and the fluidizing effect which depends on the fluctuation amplitude is also maximized. In this embodiment, the input amplitude is held at a constant level while the frequency of the fluctuation is changed. With this operation, the response amplitude is changed to increase/decrease the fluidizing effect.

Figure 18B:
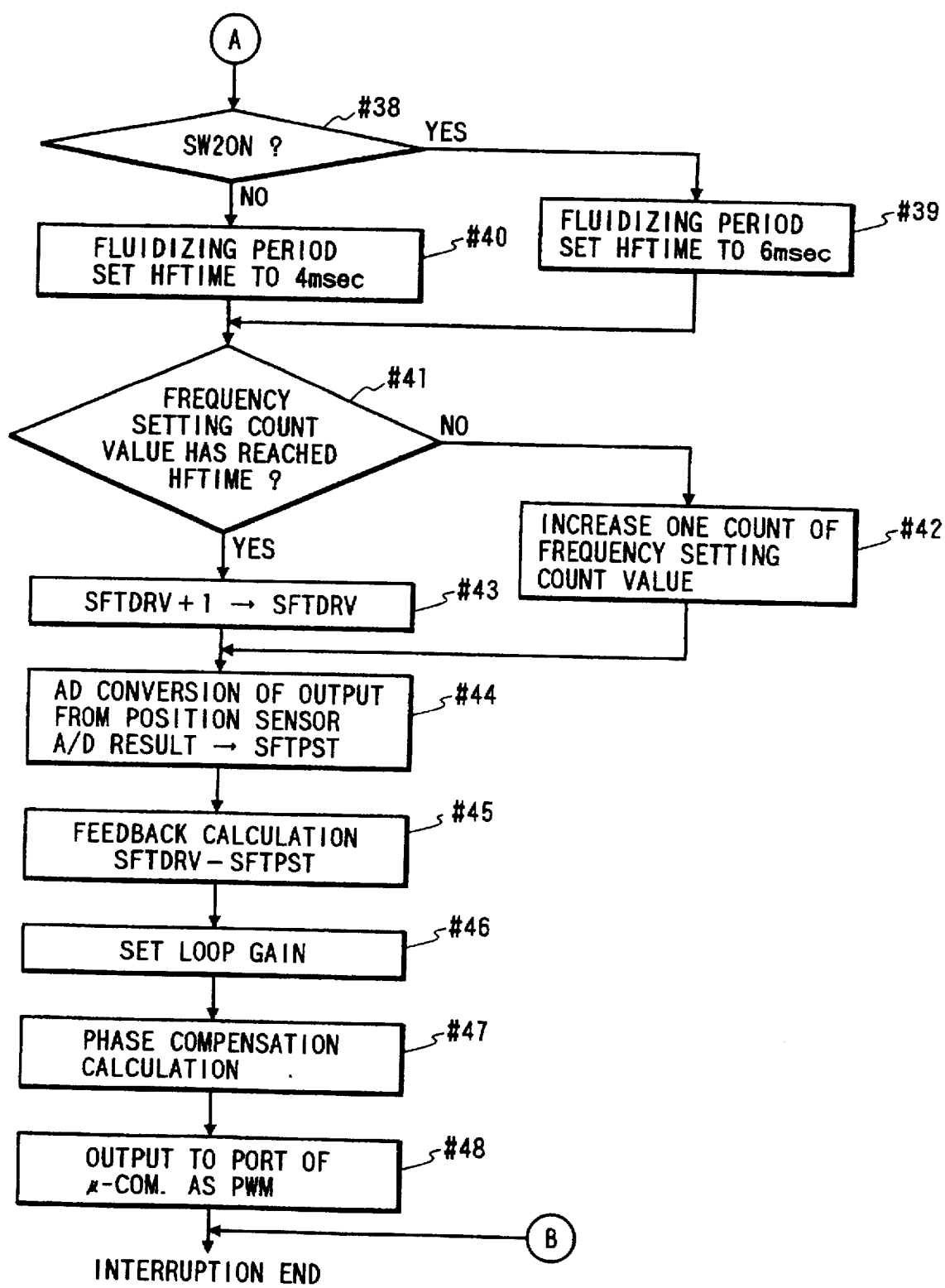
FIG. 18, which is comprised of FIGS. 18A and 18B, is a flow chart showing an operation according to the second embodiment of the present invention.

FIGS. 18A and 18B are flow charts showing the operation of the second embodiment. The arrangement is the same as in the first embodiment, and a detailed description thereof will be omitted. The second embodiment differs from the first embodiment only in steps #39 to #43, and this portion will be described. [Step #39] Since an exposure operation is being performed, a fluidizing period HFTIME is set to be 6 msec (about 160 Hz) to maximize the effect.

In this case, the frequency of the fluctuation almost equals the resonance frequency of the control system, as described above. Therefore, the response amplitude with respect to the same input amplitude is maximized, and the fluidizing effect is also maximized. [Step #40] Since the exposure operation is not being performed, the fluidizing period HFTIME is set to be 4 msec (250 Hz) to minimize the fluctuation transmitted to the photographer.

In this case, the response amplitude with respect to the same input amplitude becomes smaller than that obtained when the period HFTIME is set to be 6 msec. The fluidizing effect becomes small, and the fluctuation transmitted to the photographer also becomes small. [Step #41] It is determined whether the frequency setting count value for fluidizing has reached the set value HFTIME. [Step #42] Since the fluidizing timing is not reached, the frequency setting count value is incremented by one. [Step #43] Since the fluidizing timing is reached, level 1 is added to the image blur correction driving data to generate new image blur correction driving data.

As described above, even when the fluidizing frequency is changed, the same effect as in the first embodiment is obtained.

The third embodiment of the present invention will be described below. Fluidizing can have an adverse effect depending on the amplitude and the shutter speed. For example, at a high shutter speed which is less susceptible to the influence of a hand fluctuation, hardly any adverse effect of friction is observed, and the resolving power is high. In this case, if fluidizing is performed, the resolving power is lowered by the fluctuation for fluidizing, resulting in a shooting result with some image blur. This problem can be avoided by performing fluidizing only when the shutter speed is low, and the influence of a hand fluctuation is large.

Figure 19:
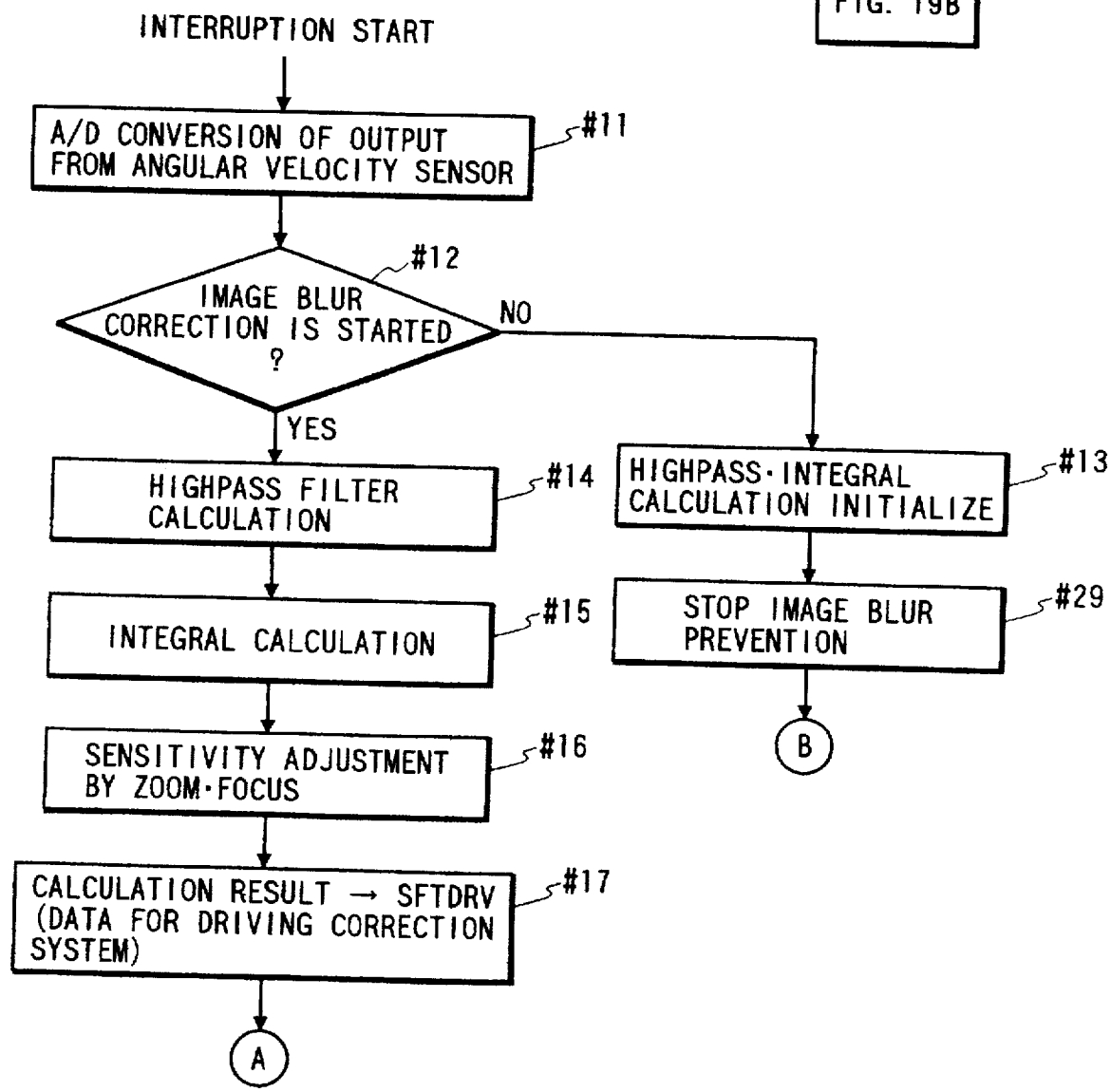
FIG. 19, which is comprised of FIGS. 19A and 19B, is a flow chart showing an operation according to the third embodiment of the present invention.

FIGS. 19A and 19B are flow charts showing the sequence of this operation. The arrangement is the same as in the above-described embodiments, and a detailed description thereof will be omitted. In FIGS. 19A and 19B, only steps #51 and #52 are added to the flow chart of FIGS. 17A and 17B, and this portion will be described below. [Step #51] Since a switch SW2 is ON in step #18, it is determined whether the shutter speed is lower than 1/15 s. The shutter speed can be determined from communication with the camera in the main routine. If YES in step #51, the flow advances to step #19. If NO in step #51, the flow advances to step #52. [Step #52] Since the shutter speed is higher than 1/s1, the fluidizing level (amplitude) is set to be 0 and fluidizing is not performed.

With this operation, the resolving power can be prevented from being lowered by the fluctuation for fluidizing when the shutter speed is high and the influence of a hand fluctuation is small. At a low shutter speed, the image blur correction characteristic is improved, thereby achieving high performance. In this case, the fluidizing level (amplitude) is directly changed in accordance with the shutter speed. However, as in the second embodiment, the amplitude may be changed by changing the fluidizing frequency.

In the above embodiments, the friction reduction effect of fluidizing is increased/decreased by changing the amplitude (in the second embodiment, the frequency is changed: however, in this embodiment, the resonance frequency characteristic of the control system is used, the amplitude is changed by changing the frequency, and finally, the friction reduction effect is increased/decreased by changing the amplitude). However, on the basis of the above-described relationship between the frequency and the friction reduction effect of fluidizing (i.e., at the same amplitude, as the frequency becomes higher, the friction reduction effect becomes larger), the friction reduction effect may be increased/decreased by changing the frequency while maintaining a substantially predetermined amplitude.

In addition, the friction reduction effect may be increased/decreased by changing both the amplitude and the frequency.

In the above embodiments, the correction lens is fluctuated to generate the fluidizing effect. However, a member (e.g., the yokes 712 and 72, or the like) for supporting the correction lens unit may be fluctuated.

As has been described above, according to the embodiments of the present invention, when the respective elements are set as described above, and the fluidizing method is used to drive the optical element (correction lens) for image blur prevention, the frictional force is reduced, and driving control is performed. With this arrangement, image blur correction can be appropriately performed without any response delay of the optical element. At this time, (appropriately setting the amplitude and frequency), the influence on an image can be suppressed within an allowance. At the same time, the fluctuation transmitted to the photographer is minimized. With this arrangement, a lens barrel for effectively preventing an image blur caused by a fluctuation or the like without causing discomfort on the side of the photographer, and an optical equipment using the lens barrel can be achieved.

According to the embodiments of the present invention, the fluidizing level and frequency can be changed for preparation for a shooting operation and for a shooting operation. The level is lowered during preparation for a shooting operation to minimize the fluctuation transmitted to the photographer. During a shooting operation in a short time, the user is not disturbed by the fluctuation even when the level is raised, and the shooting result is improved.

The fluidizing level and frequency can also be changed in accordance with the shutter speed. When the shutter speed is high, and fluidizing is unnecessary, the level is set to be low or zero to prevent the resolving power from being lowered by fluidizing. When the shutter speed is low, the image blur correction characteristic is improved, so that the performance can be improved.

In the above embodiments, the image blur correction apparatus is incorporated in an interchangeable lens. However, the image blur correction apparatus need not always be incorporated in an interchangeable lens. The image blur correction apparatus may be applied as an adapter such as an extender inserted between the camera and the lens, or an accessory inserted in a conversion lens attached in front of the interchangeable lens.

In addition, the image blur correction apparatus may be applied to a camera such as a lens shutter camera and a video camera, or can be applied as a unit constituting another optical equipment or device. In the above embodiments, an angular velocity sensor is used as a fluctuation sensor. However, an angular acceleration sensor, an acceleration sensor, a velocity sensor, an angular displacement sensor, a displacement sensor, or a method of detecting an image blur itself may be used as far as an image blur can be detected.

Also, while the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

In addition, the individual components shown in schematic or block form in the Drawings are all well-known in the camera arts and their specific construction and operation are not critical to the operation or best mode for carrying out the invention.

Furthermore, the present invention may incorporate a combination of the above embodiments and their technical elements, as needed.

What is claimed is:

1. An image blur prevention apparatus comprising:
a movable member which moves for preventing an image blur;
a support member for movably supporting said movable member, said support member comprising a contact member contacting said movable member, and supporting said movable member to move said movable member slidably against said contact member; and
an operation device which fluctuates at least one of said movable member and said contact member against the other, as an operation different from an operation of said movable member for preventing an image blur, to thereby change a frictional state between said movable member and said contact member to a kinetic frictional state.

2. An apparatus according to claim 1, wherein said movable member comprises an optical device.

3. An apparatus according to claim 1, wherein said movable member comprises means for correcting image blur.

4. An apparatus according to claim 3, wherein said support member comprises means for supporting said movable member so that said movable member slides within a predetermined plane.

5. An apparatus according to claim 1, wherein said operation device comprises means for fluctuating the at least one member with the fluctuation when said movable member is in operation for image blur prevention.

6. An apparatus according to claim 1, wherein said operation device comprises means for fluctuating said movable member with a predetermined fluctuation.

7. An apparatus according to claim 6, wherein said operation device comprises means for inputting a signal for fluctuating said movable member to a driving unit for driving said movable member.

8. An apparatus according to claim 7, wherein said operation device comprises means for adding a driving signal for causing said movable member to perform an image blur pervention operation and a signal for fluctuating said movable member.

9. An apparatus according to claim 8, wherein the driving signal is a signal corresponding to an image blur state, adding a driving signal for causing said movable member to perform an image blur prevention operation and a signal for fluctuating said movable member.

10. An apparatus according to claim 1, wherein said operation device comprises means for fluctuating said movable member at an amplitude at which a displacement of an image caused by the fluctuation of the at least one member is at most 50 μm.

11. An apparatus according to claim 1, wherein said operation device comprises means for fluctuating the at least one member at a frequency of at least 50 Hz.

12. An apparatus according to claim 1, wherein said member comprises an optical member.

13. An apparatus according to claim 1, wherein said operation device comprises means for changing a degree of the operation.

14. An apparatus according to claim 13, wherein said operation device comprises means for changing the degree of the operation depending on whether an exposure operation is being performed.

15. An apparatus according to claim 14, wherein said operation device comprises means for causing the operation during the exposure operation to be larger than that when the exposure operation is not being performed.

16. An apparatus according to claim 13, wherein said operation device comprises means for changing the degree of the operation in accordance with an exposure condition.

17. An apparatus according to claim 16, wherein said operation device comprises means for regulating the operation when a shutter speed becomes higher than a predetermined value.

18. An apparatus applied to an image blur prevention apparatus for preventing an image blur by operating a movable member, said apparatus comprising:

a support member for movably supporting said movable member, said support member comprising a contact member contacting said movable member, and supporting said movable member to move said movable member slidably against said contact member;

an operation device which fluctuates at least one of said movable member and said contact member against the other, as an operation different from an operation of said movable member for preventing an image blur, to thereby change a frictional state between said movable member and said contact member to a kinetic frictional state.

19. An optical apparatus comprising:

a movable member which moves for preventing an image blur;

a support member for movably supporting said movable member, said support member comprising a contact member contacting said movable member, and supporting said movable member to move said movable member slidably against said contact member; and an operation device which fluctuates at least one of said movable member and said contact member against the other, as an operation different from an operation of said movable member for preventing an image blur, to thereby change a frictional state between said movable member and said contact member to a kinetic frictional state.

20. An image blur preventing apparatus comprising:

a movable member which moves for preventing an image blur;

a support member for movably supporting said movable member, said support member comprising a contact member contacting said movable member, and supporting said movable member to move said movable member slidably against said contact member; and an operation device which fluctuates at least one of said movable member and said contact member against the other at a frequency higher than a frequency during operation for preventing image blur, as an operation different from an operation of said movable member for preventing an image blur.

21. An apparatus according to claim 20, wherein said operation device comprises means for fluctuating at least one of said movable member and said contact member against the other at a frequency of at least 50 Hz, as an operation different from an operation of said movable member for preventing an image blur.

22. An apparatus according to claim 20, wherein said operation device comprises means for fluctuating at least one of said movable member and said contact member against the other at a frequency of at least 50 Hz to at most 300 Hz, as an operation different from an operation of said movable member for preventing an image blur.

23. An apparatus according to claim 20, wherein said operation device comprises means for fluctuating said movable member at a frequency higher than a frequency for preventing image blur as an operation different from an operation of said movable member for preventing image blur.

24. An apparatus according to claim 23, wherein said operation device comprises means for fluctuating said movable member at a frequency higher than a frequency for preventing image blur, while said movable member performs the operation for preventing image blur.

25. An apparatus according to claim 24, further comprising a driving device for causing said movable member to operate corresponding to an image blur signal in accordance with an image blur state, and said operation device comprises means for operating said driving device corresponding to a driving signal which is formed from a combination of the image blur signal and a signal for causing the fluctuation at the frequency higher than the frequency during an operation for preventing image blur.

* * * * *

UNITED STATES PATENT AND TRADEMARK OFFICE
CERTIFICATE OF CORRECTION

PATENT NO. : 5,761,546
DATED : June 2, 1998
INVENTOR : SHINJI IMADA

It is certified that error appears in the above-identified patent and that said Letters Patent is hereby corrected as shown below:

COLUMN 3:

line 29, "p resent" should read --present--; and
    line 58, "cross sectional" should read --cross-sectional--.

COLUMN 8:

line 51, "$78_{i2p}$," should read --$78_{i2p}$--.

COLUMN 9:

line 20, "a clussed" should read --accessed--.

COLUMN 11:

line 17, "11L0." should read --110.--;
    line 34, "general" should read --generally--; and
    line 37, "mode." should read --mode selection switch 123 (also indicated by reference symbol SWM) is turned on/off to change the exposure mode.--.

UNITED STATES PATENT AND TRADEMARK OFFICE
CERTIFICATE OF CORRECTION

PATENT NO. : 5,761,546
DATED : June 2, 1998
INVENTOR : SHINJI IMADA

It is certified that error appears in the above-identified patent and that said Letters Patent is hereby corrected as shown below:

COLUMN 12:

line 23, "and" should read --an--.

COLUMN 15:

line 3, "1/51," should read --1/15,--.

COLUMN 17:

lines 10 through 12 should be deleted.

Signed and Sealed this

Second Day of February, 1999

Attest:

*Attesting Officer*

*Acting Commissioner of Patents and Trademarks*